US011366842B1

(12) United States Patent
Swaminathan et al.

(10) Patent No.: US 11,366,842 B1
(45) Date of Patent: Jun. 21, 2022

(54) IT SERVICE MONITORING BY INGESTED MACHINE DATA WITH KPI PREDICTION AND IMPACTOR DETERMINATION

(71) Applicant: Splunk Inc., San Francisco, CA (US)

(72) Inventors: Arvind Swaminathan, Irvine, CA (US); Xiang Zhou, Cupertino, CA (US)

(73) Assignee: Splunk Inc., San Francisco, CA (US)

( * ) Notice: Subject to any disclaimer, the term of this patent is extended or adjusted under 35 U.S.C. 154(b) by 260 days.

(21) Appl. No.: 16/147,170

(22) Filed: Sep. 28, 2018

(51) Int. Cl.
*G06F 7/00* (2006.01)
*G06F 16/33* (2019.01)
*G06N 5/02* (2006.01)

(52) U.S. Cl.
CPC .......... *G06F 16/334* (2019.01); *G06N 5/022* (2013.01)

(58) Field of Classification Search
CPC ........... G06F 16/2474; G06F 16/24573; G06F 16/248; G06F 16/334; G06Q 10/00; G06N 5/022; G06N 5/04
USPC ................ 707/725, 726, 765, 776, 722, 769
See application file for complete search history.

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 2015/0289149 | A1* | 10/2015 | Ouyang ................ H04W 16/18 370/252 |
| 2016/0103883 | A1* | 4/2016 | Ramani .................. G06Q 10/00 707/725 |
| 2017/0006135 | A1* | 1/2017 | Siebel .................... G06F 9/5072 |
| 2019/0098106 | A1 | 3/2019 | Mungel et al. |

(Continued)

OTHER PUBLICATIONS

Splunk Enterprise 8.0.0 Overview, available online, retrieved May 20, 2020 from docs.splunk.com.

(Continued)

*Primary Examiner* — Md I Uddin
(74) *Attorney, Agent, or Firm* — Lowenstein Sandler LLP

(57) ABSTRACT

A service monitoring system (SMS) transforms machine data from a monitored information technology (IT) environment into meaningful key performance indicators (KPIs) that each represents some measure of a service implemented by the environment on an ongoing basis. An overall health score for the service is determined from the KPIs and a prediction is made for a future health score. Data regarding a particular KPI and other KPIs is transformed to predicted future values for the particular KPI over a prediction window. Additionally, predicted future KPI scores may be used to determine a KPI impact score reflecting some measure of the degree to which the KPI, its related components, or processing related thereto, can influence the actual future health score. The KPI impact scores condition or direct the future operation of one or more SMS processes. Production of an impactor list identifying priority targets for interventive processing may be produced based at least on KPI impact scores and may also condition or direct the future operation of one or more SMS processes.

20 Claims, 37 Drawing Sheets

(56) References Cited

U.S. PATENT DOCUMENTS

2020/0076520 A1* 3/2020 Jana .................. H04B 17/3913

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

| Time 535 | Host 536 | Source 537 | Source Type 538 | Event 539 |
|---|---|---|---|---|
| 531 — 10/10/2000 1:55 p.m. | www1 | access.log | access_combined | 540, 541, 542, 543 — 127.0.0.1 - frank [10/Oct/2000:13:55:36 -0700] "GET /apache.gif HTTP/1.0" 200 2326 0.0947 — 545, 545 |
| 532 — 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 — 546 |
| 533 — 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 534 — 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Data Summary | | | | × |
|---|---|---|---|---|
| Hosts (5) | Sources (8) | Sourcetypes (3) | | |
| filter | | | | |
| Host ◊ | ıl | Count ◊ | Last Update ◊ | |
| mailsv | ıl ∨ | 9,829 | 4/29/14 1:32:47.000 PM | |
| vendor_sales | ıl ∨ | 30,244 | 4/29/14 1:32:46.000 PM | |
| www1 | ıl ∨ | 24,221 | 4/29/14 1:32:44.000 PM | |
| www2 | ıl ∨ | 22,595 | 4/29/14 1:32:47.000 PM | |
| www3 | ıl ∨ | 22,975 | 4/29/14 1:32:46.000 PM | |

Original Search: ← 1602
Search "error" | stats count BY host

Sent to peers: ← 1604
Search "error" | prestats count BY host

Executed by search head: ← 1606
Aggregate the prestats results received from peers

FIG. 16

IT SERVICE MONITORING BY INGESTED MACHINE DATA WITH KPI PREDICTION AND IMPACTOR DETERMINATION

CROSS REFERENCE TO RELATED APPLICATIONS

[Reserved for future use]

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 7C illustrates an example of creating and using an inverted index, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 16 is an example search query received from a client and executed by search peers, in accordance with example embodiments;

DETAILED DESCRIPTION

1.0. General Overview

Figure 1:
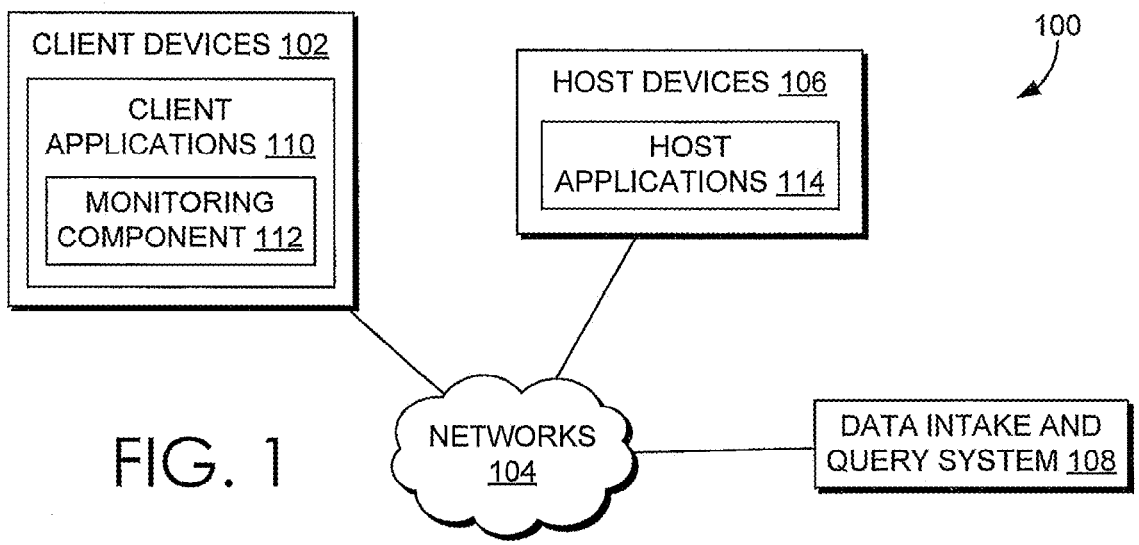
FIG. 1 is a block diagram of an example networked computer environment, in accordance with example embodiments.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, pre-defined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
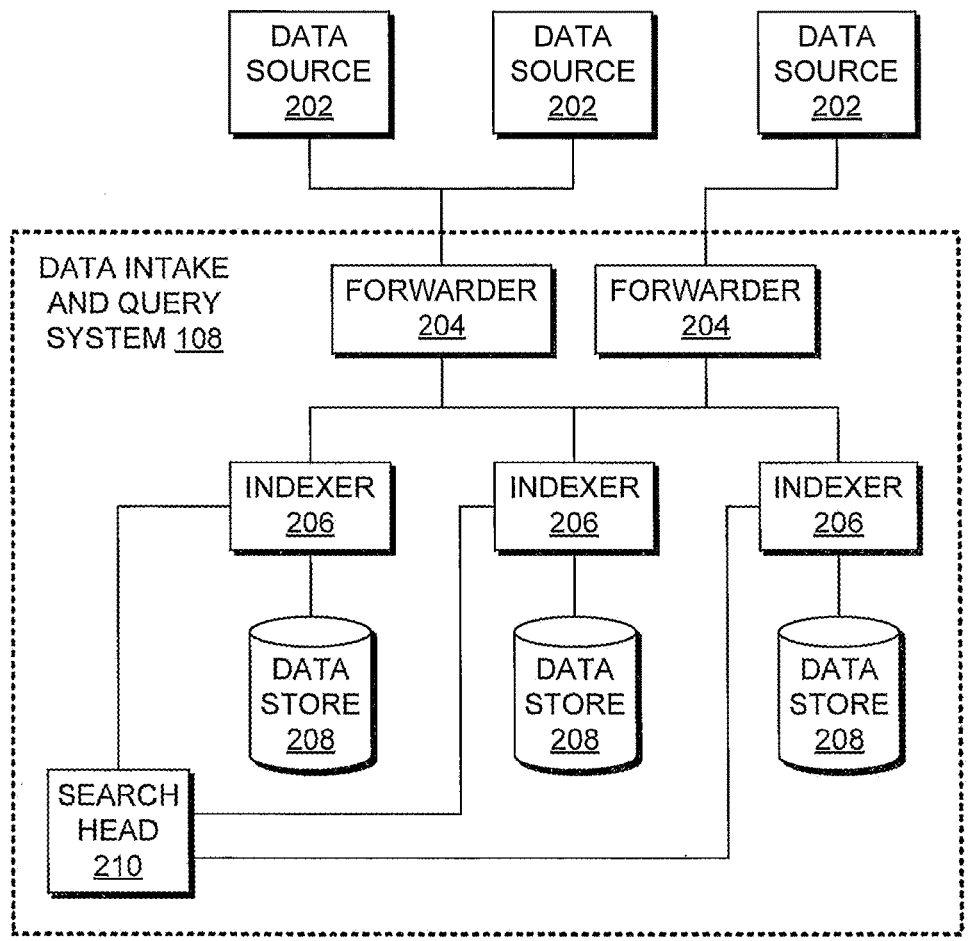
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
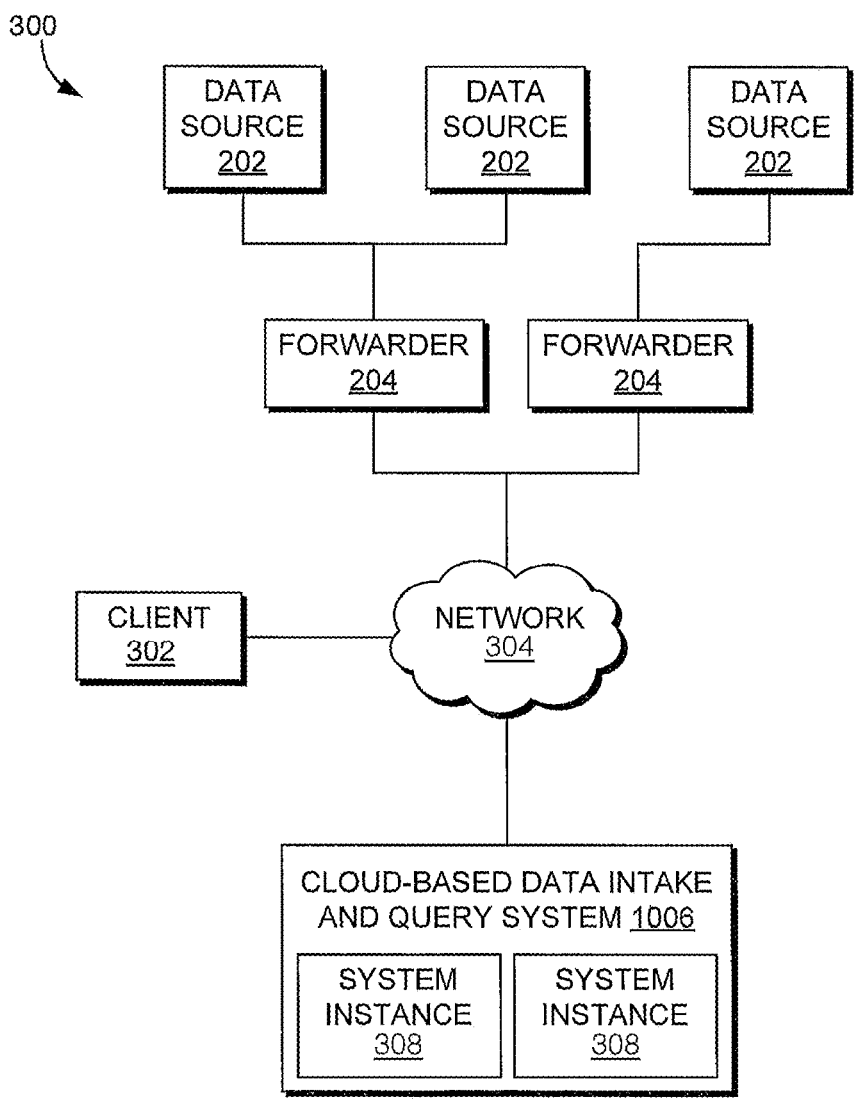
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

Figure 4:
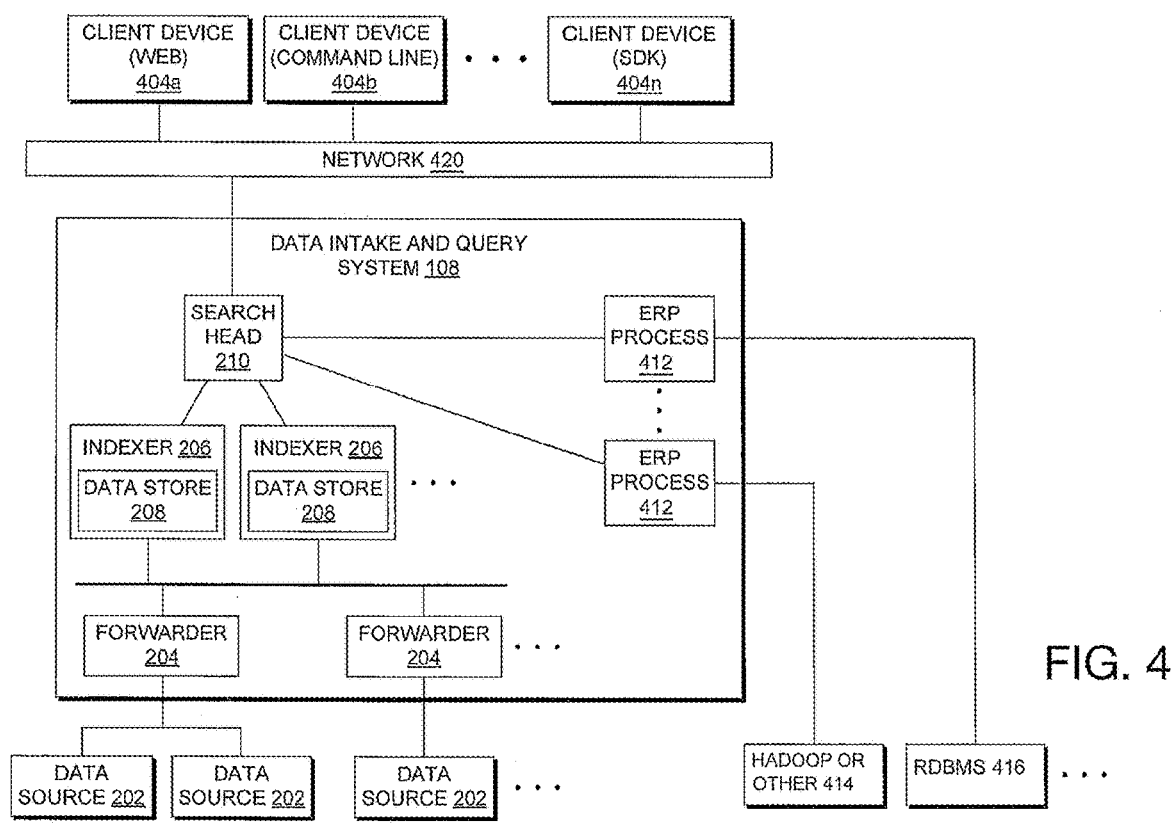
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection. Indexers here, as elsewhere, may include functionality for processing multiple data types, such as events and metrics data types discussed in reference to Indexer 436 of FIG. 18.

If the request parameters of the received search request reference an external data collection, which is not accessible to the indexers 206 of FIG. 4 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
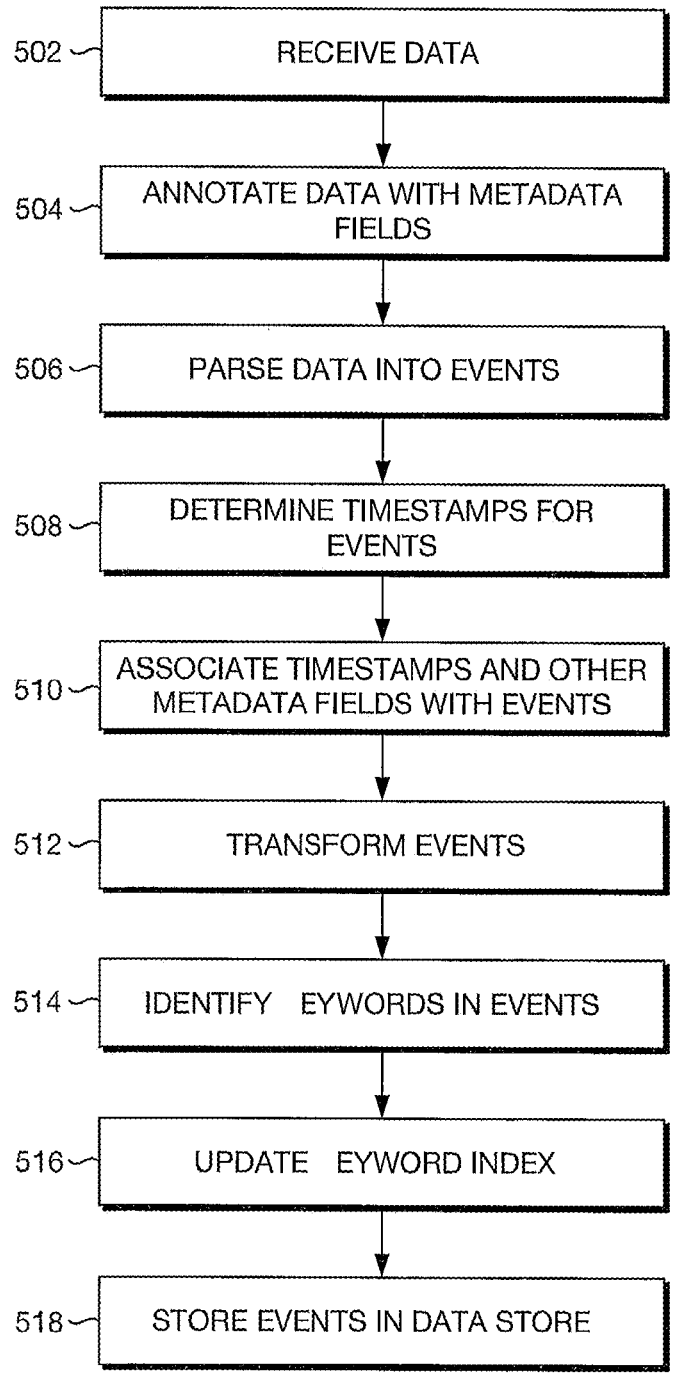
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time.

Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
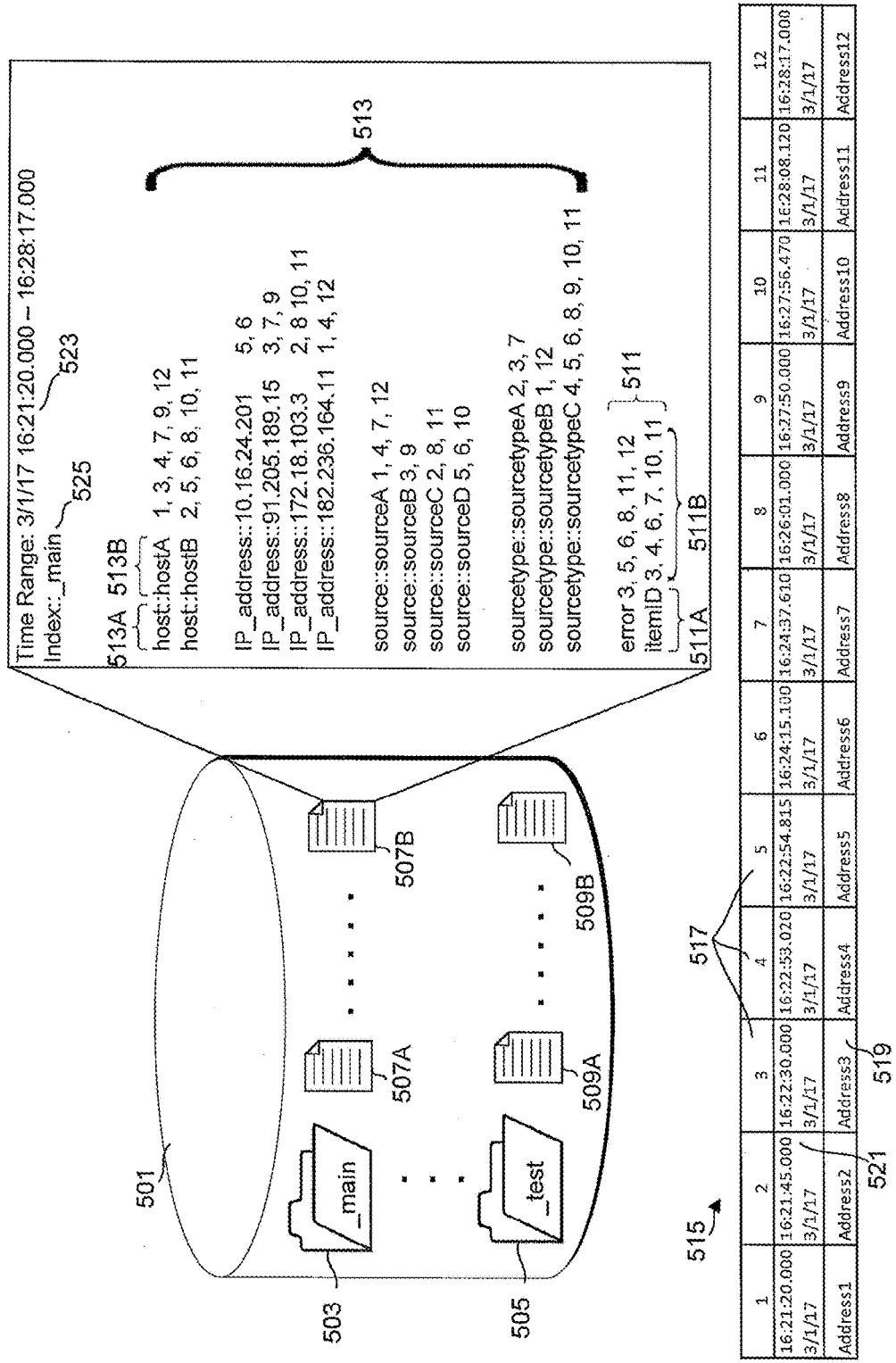
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes:sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:

28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
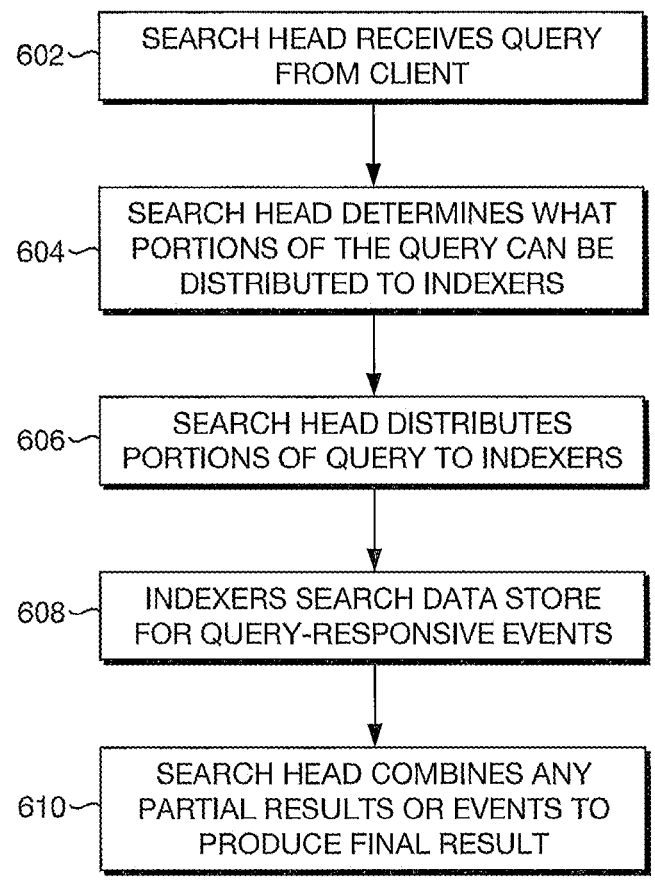
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
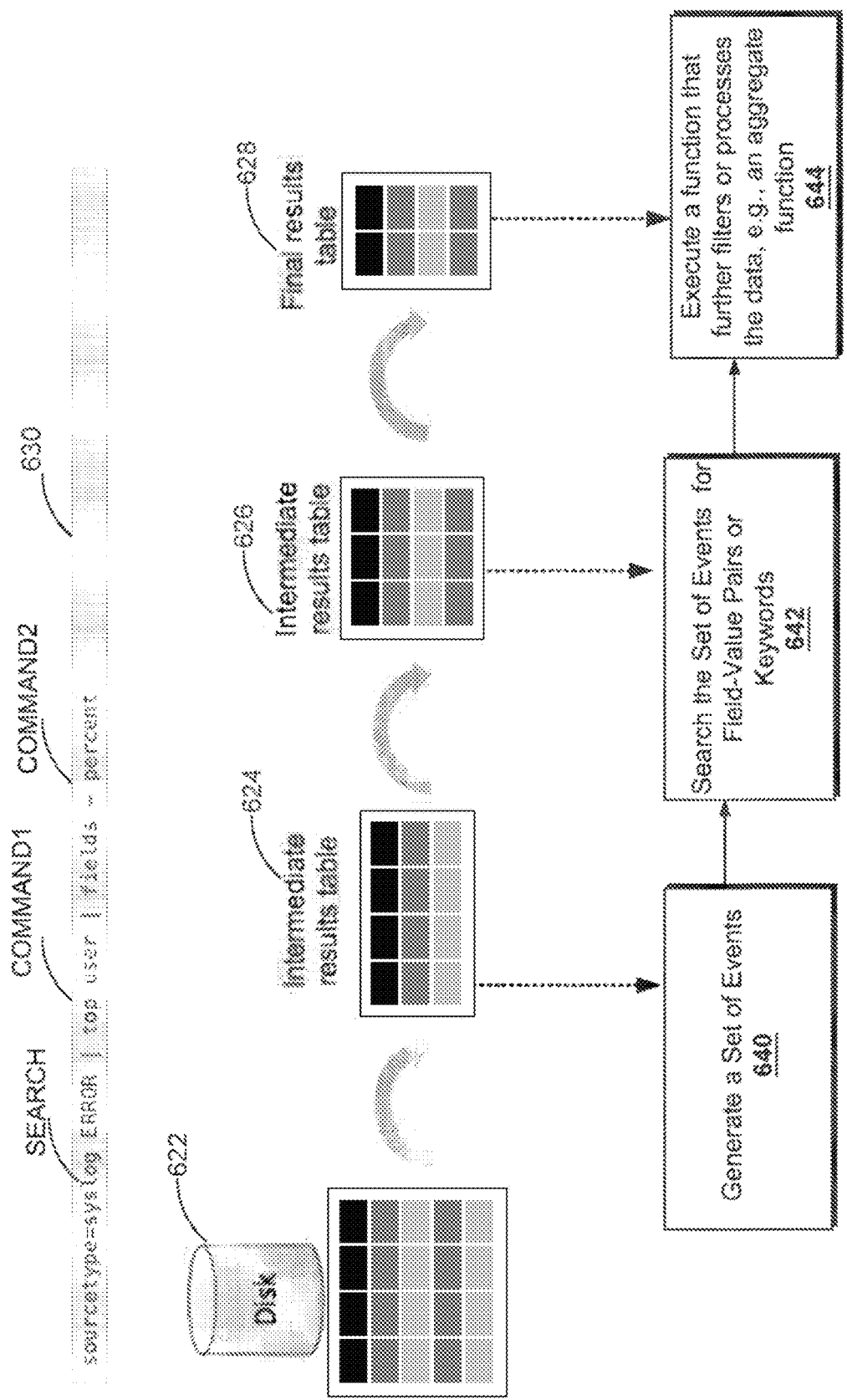
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
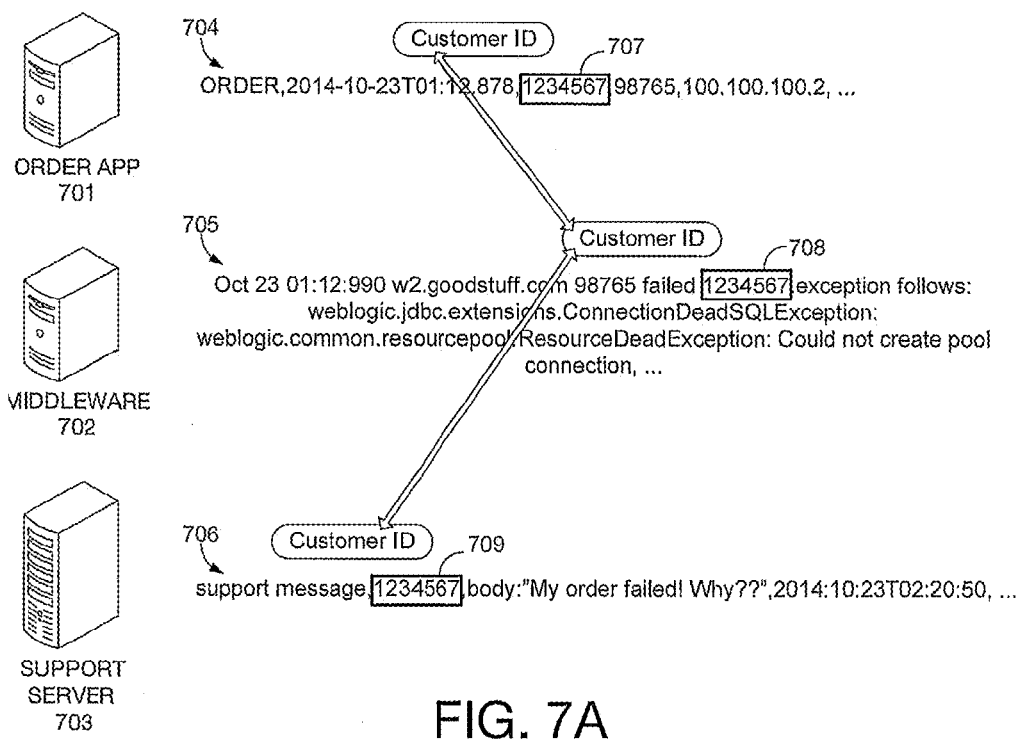
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
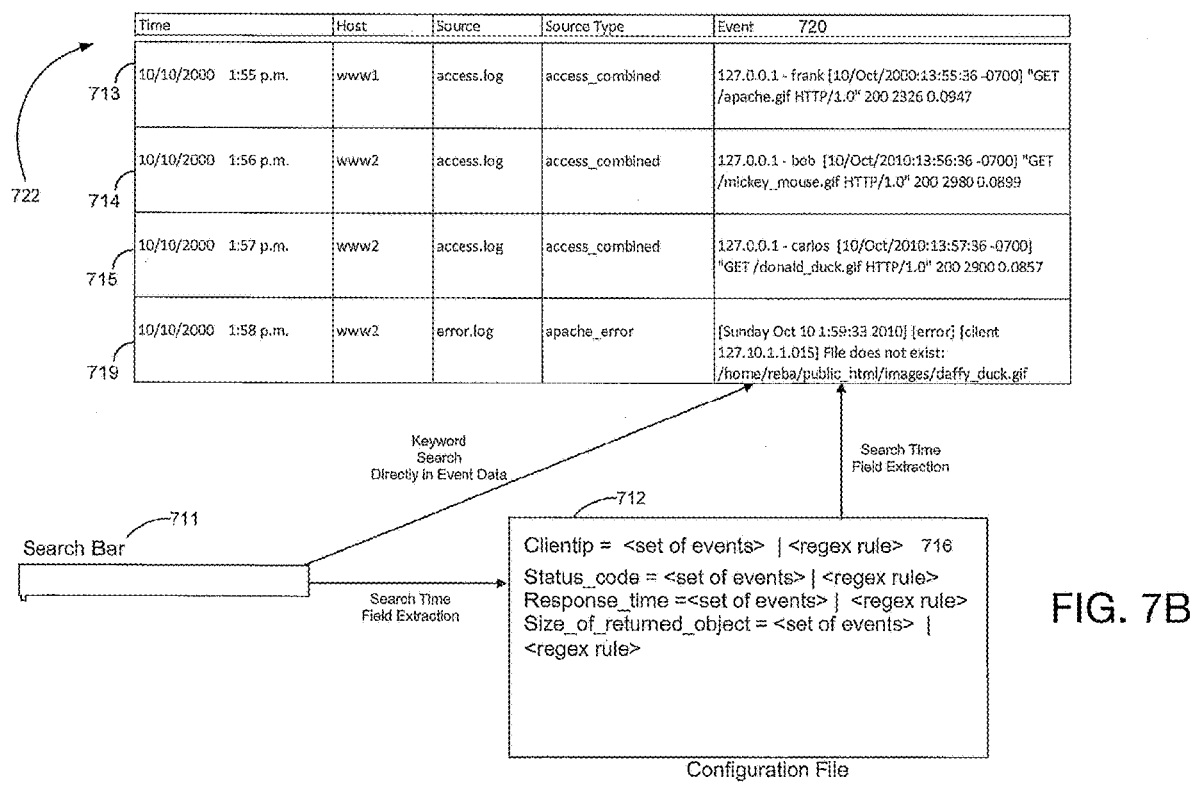
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
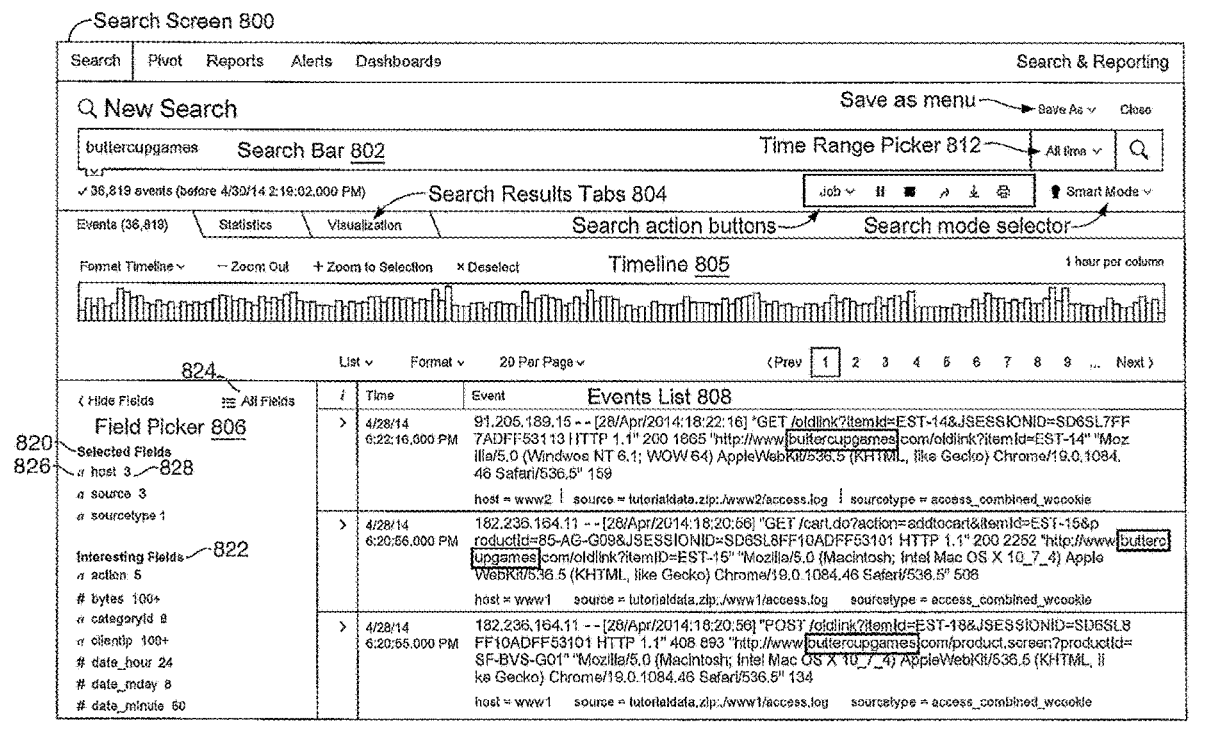

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has pre-selected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
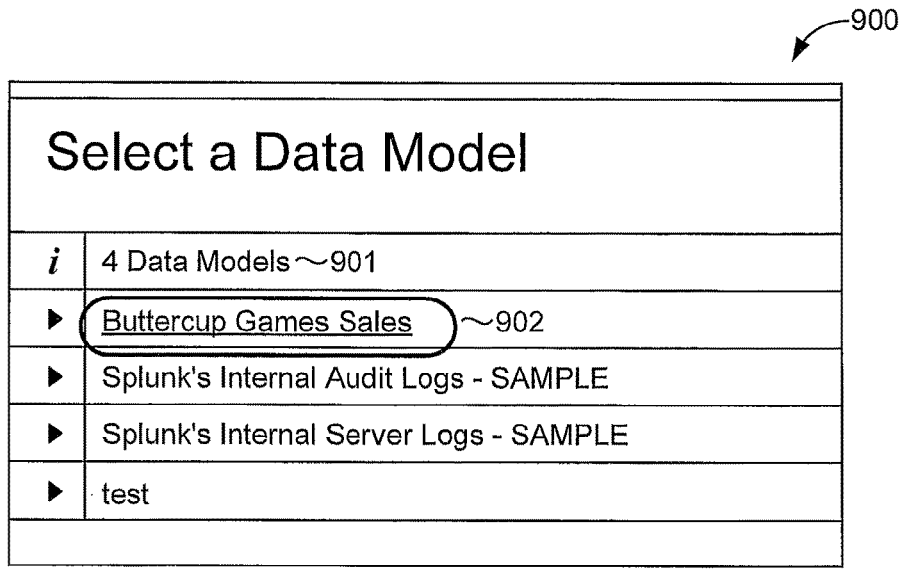

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
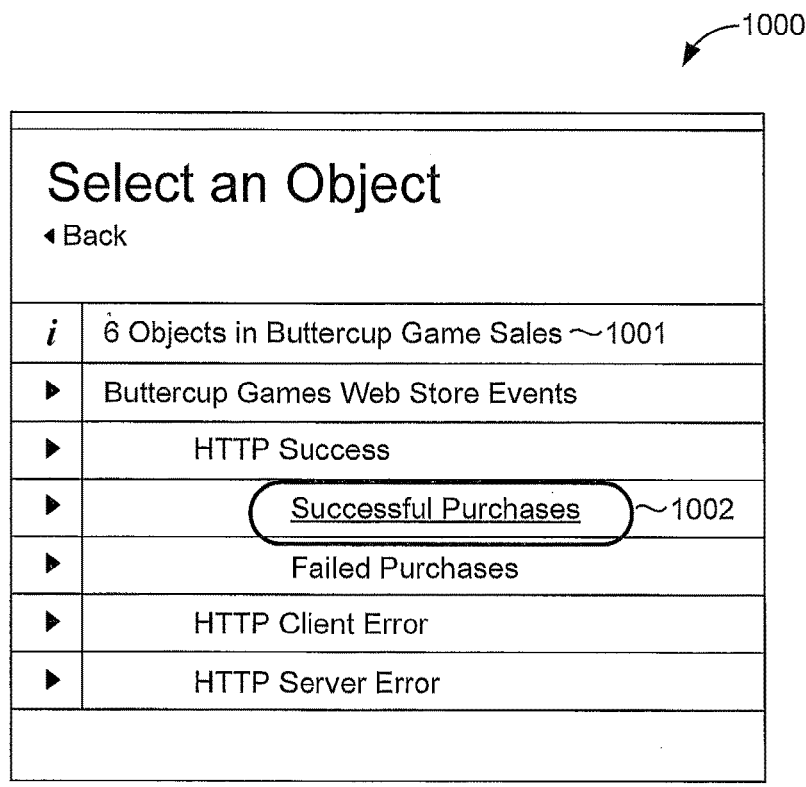

FIG. 10 illustrates an example data model object selection graphical user interface 1000 that displays available data objects 1001 for the selected data object model 902. The user may select one of the displayed data model objects 1002 for use in driving the report generation process.

Figure 11A:
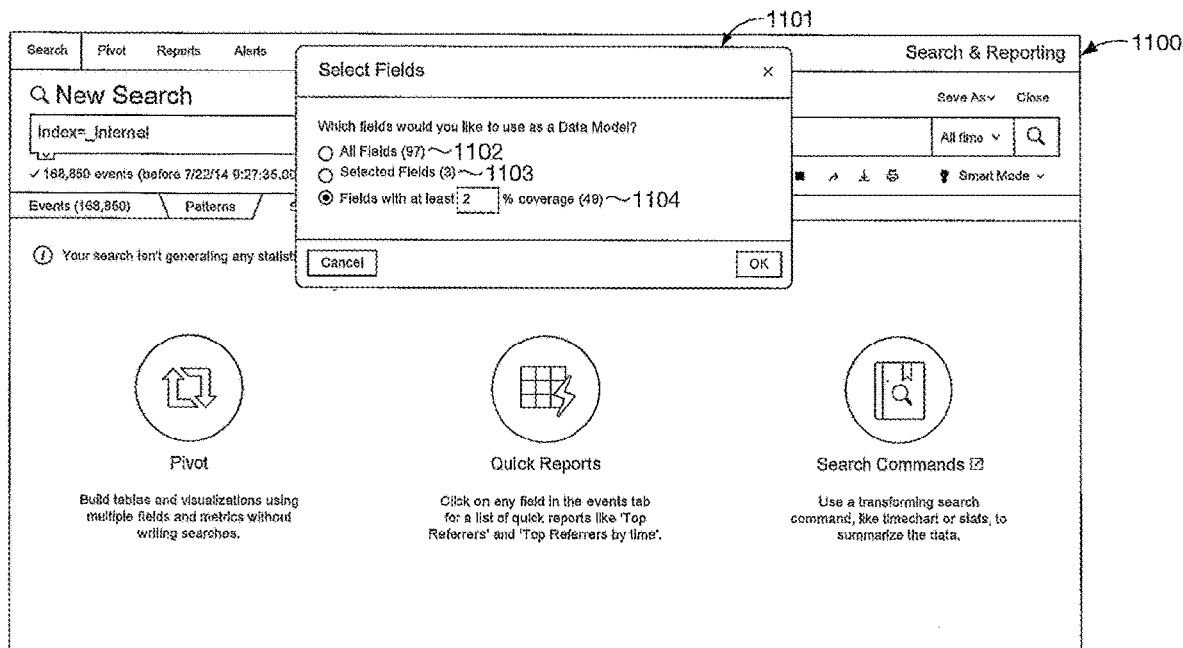

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
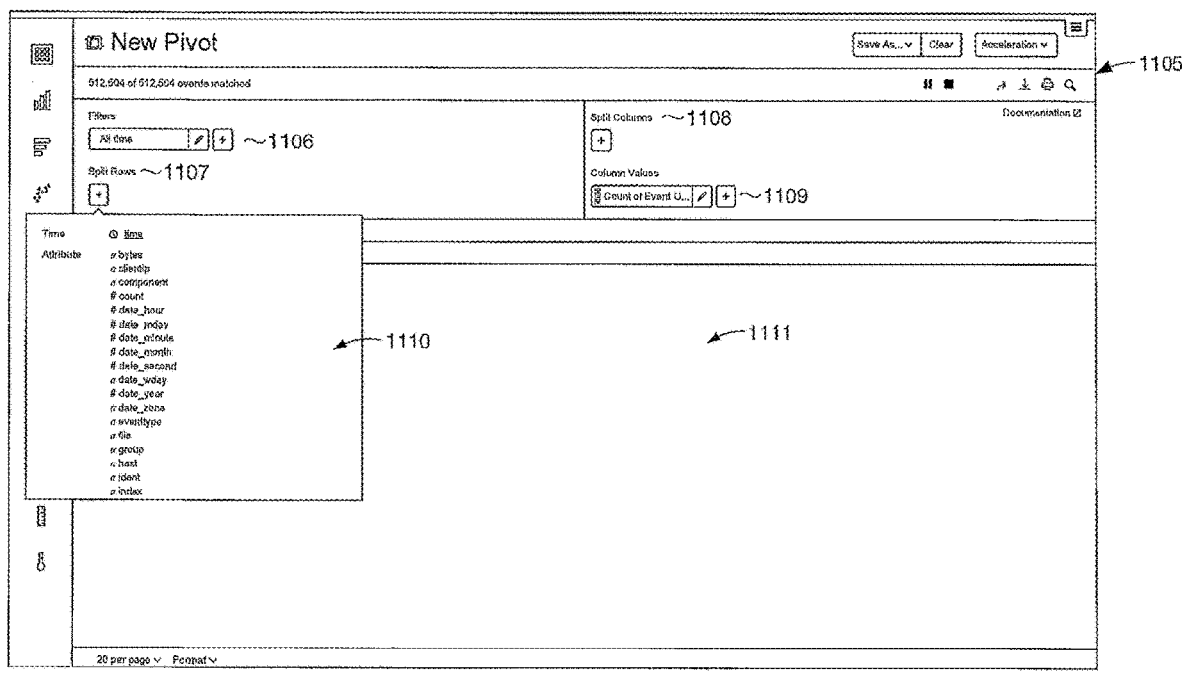
Figure 11C:
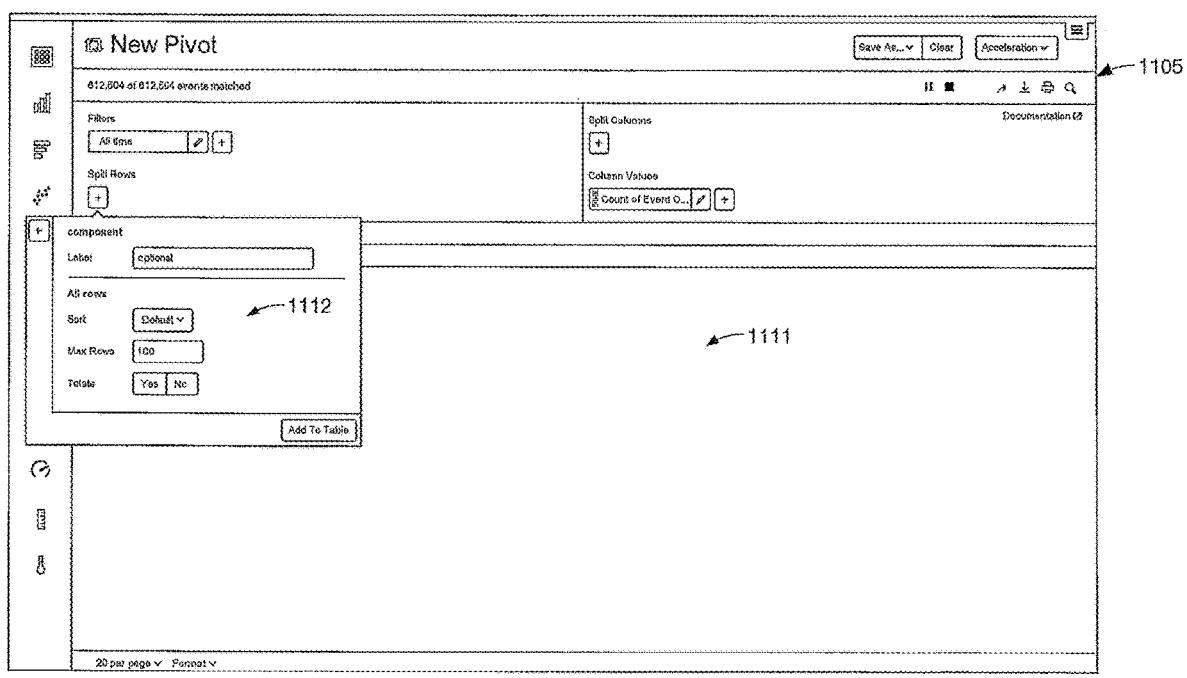

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
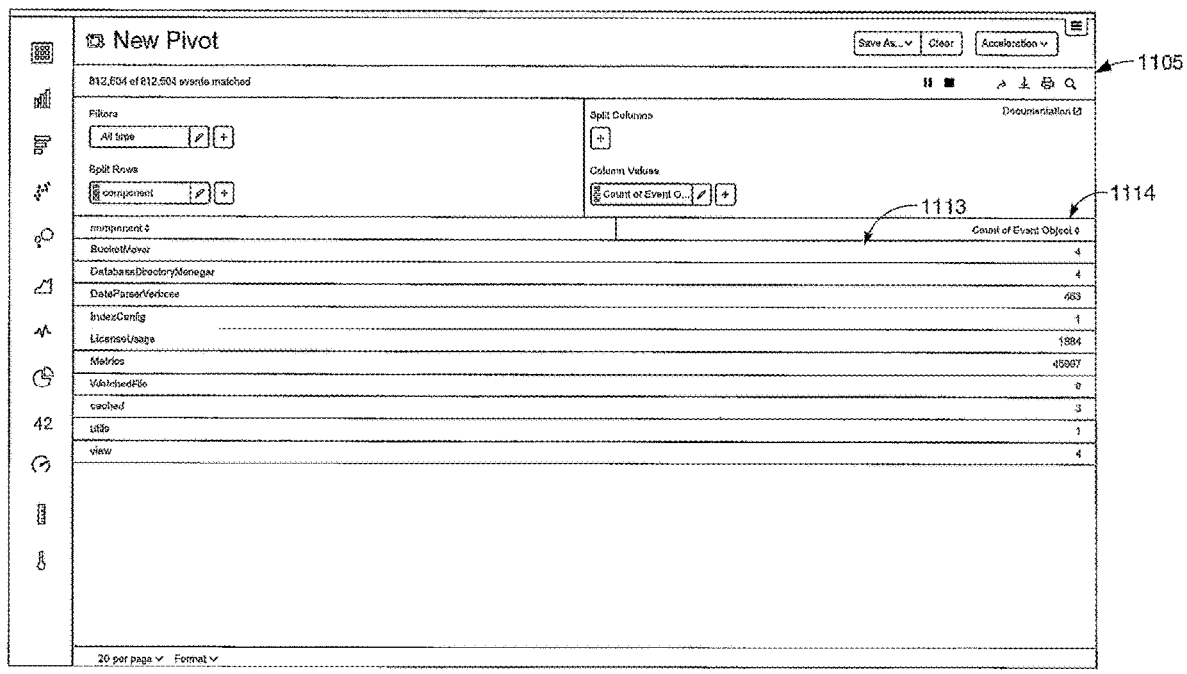

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
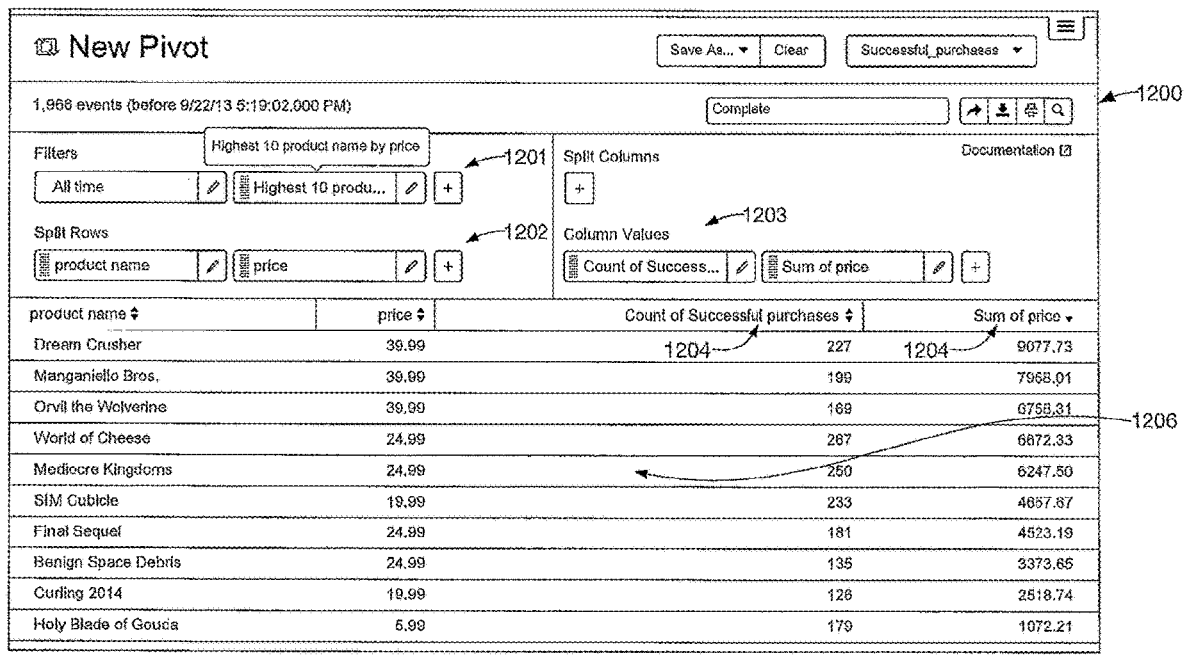

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
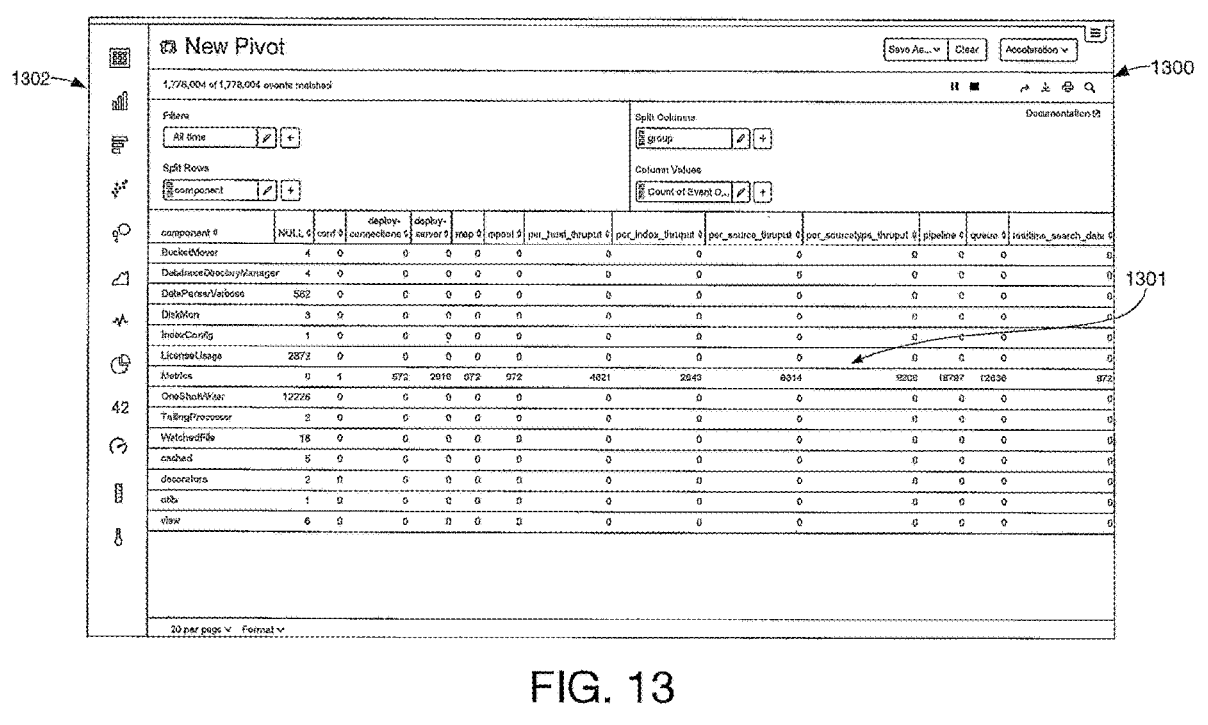
Figure 14:
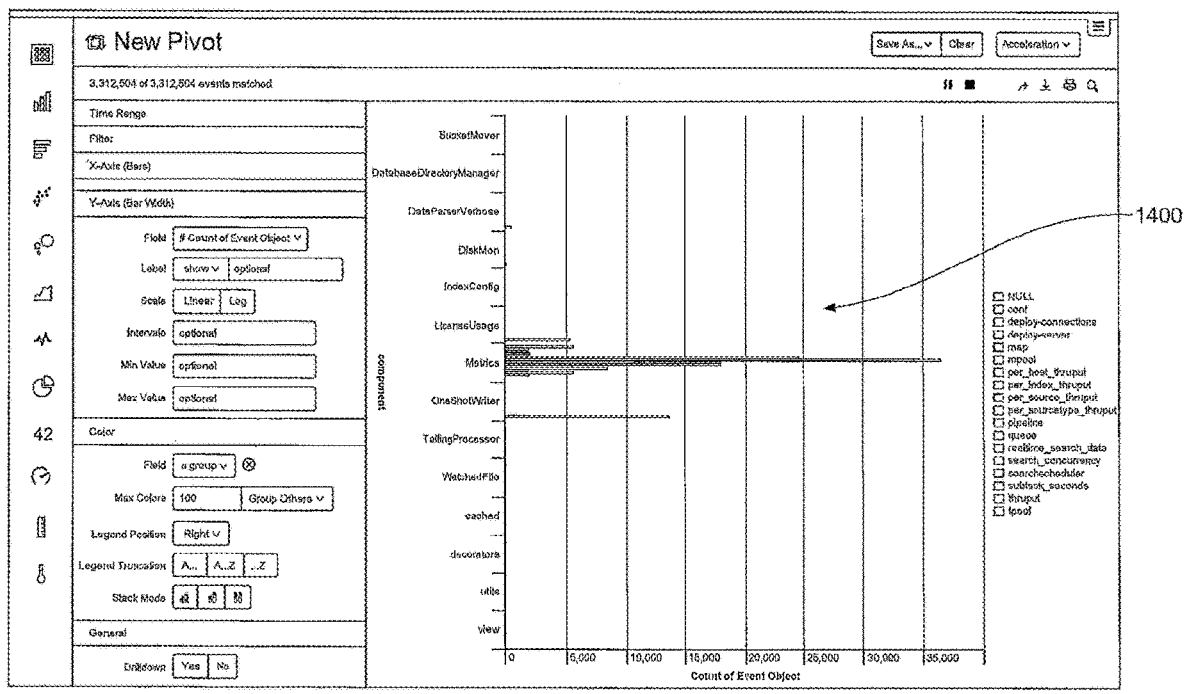
Figure 15:
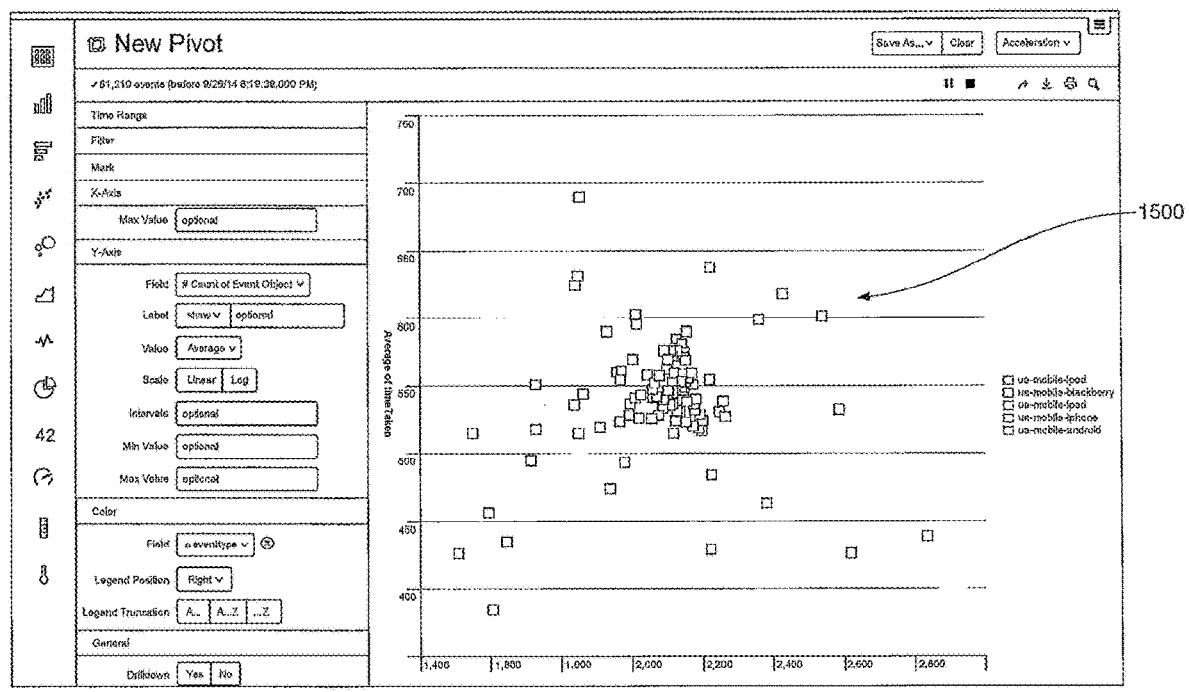

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-know compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searachable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

Figure 7C:
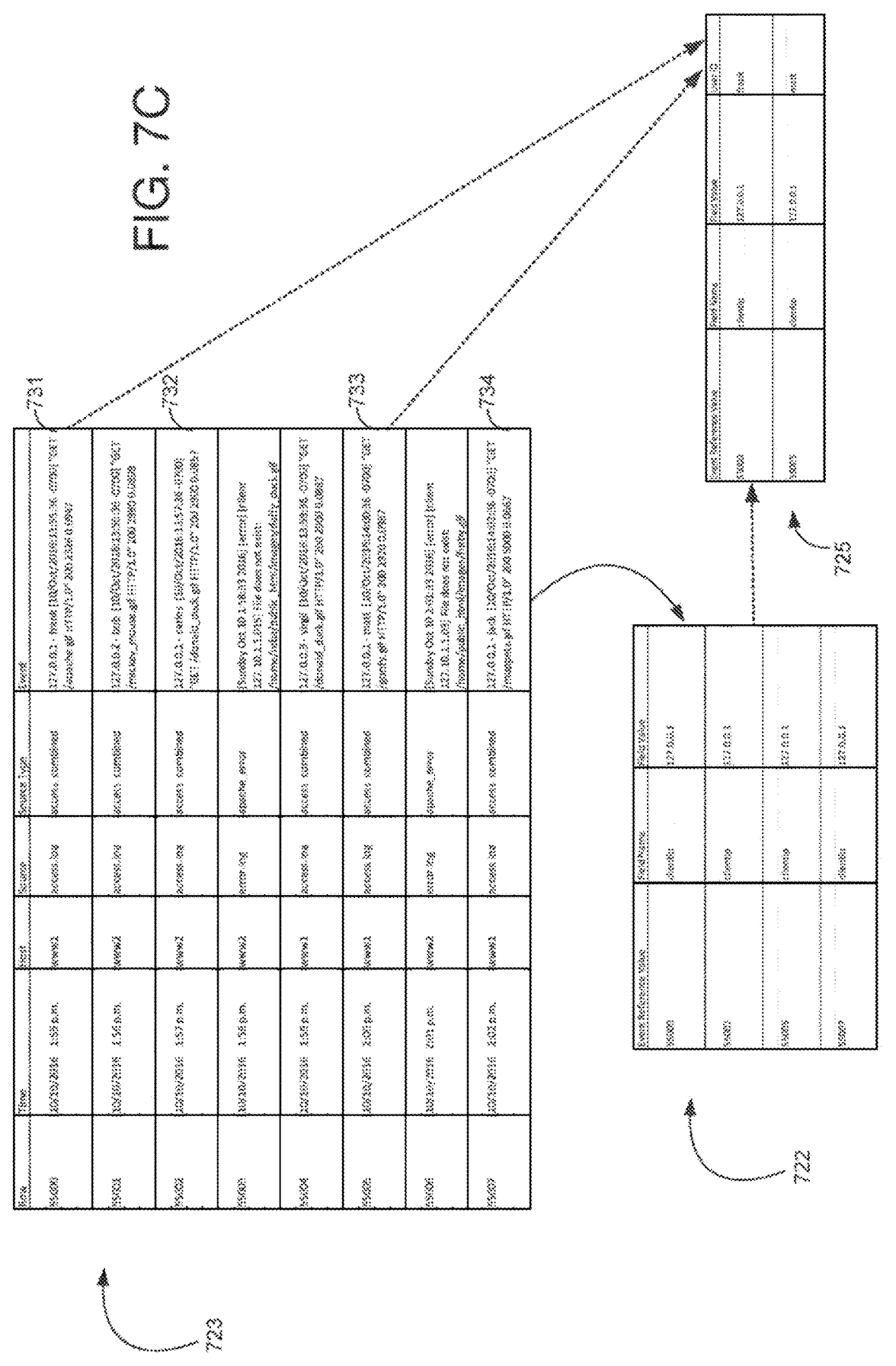

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in invertex index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1. Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
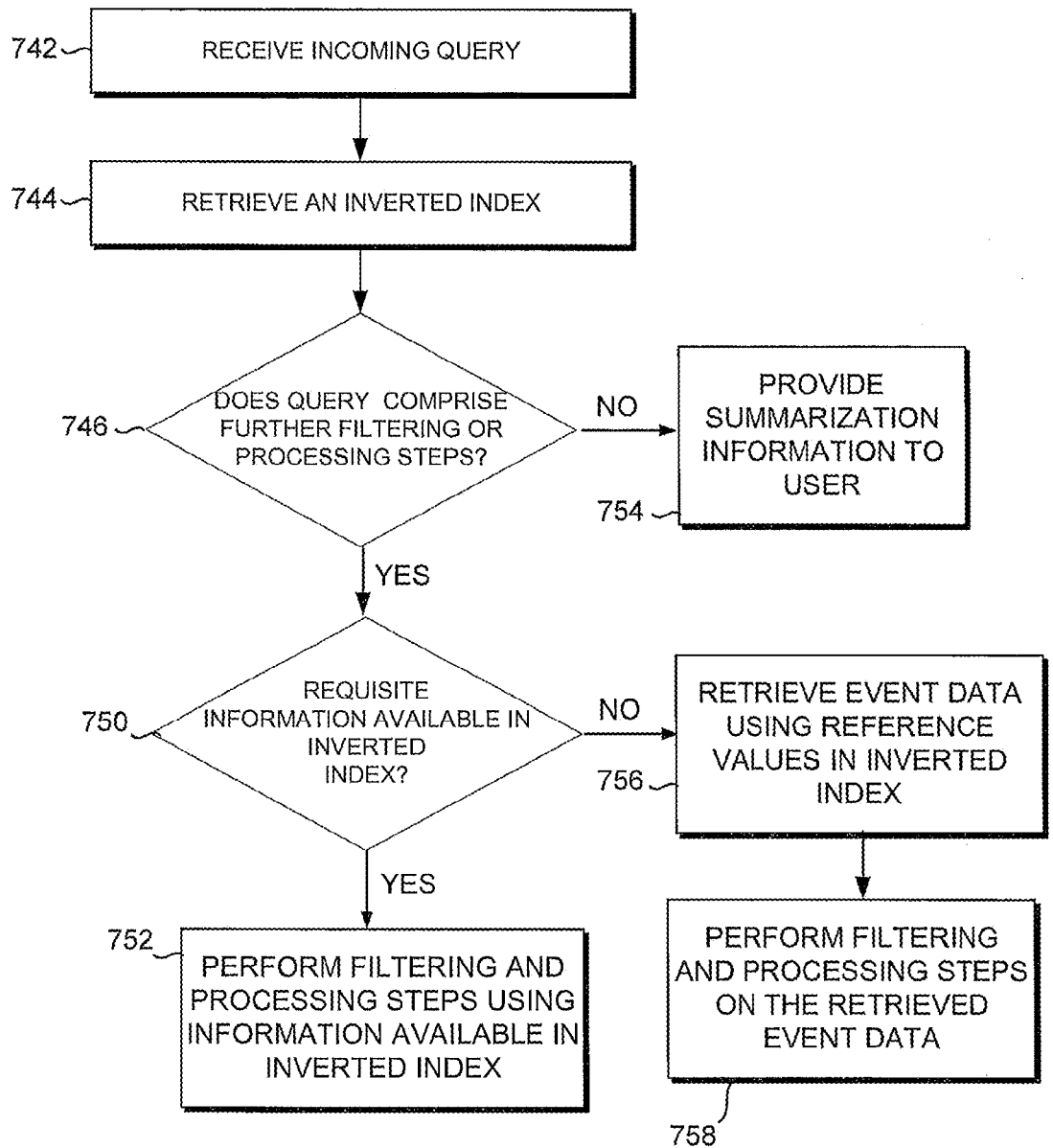
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be receive as a user generated query entered into search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOUR- NALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
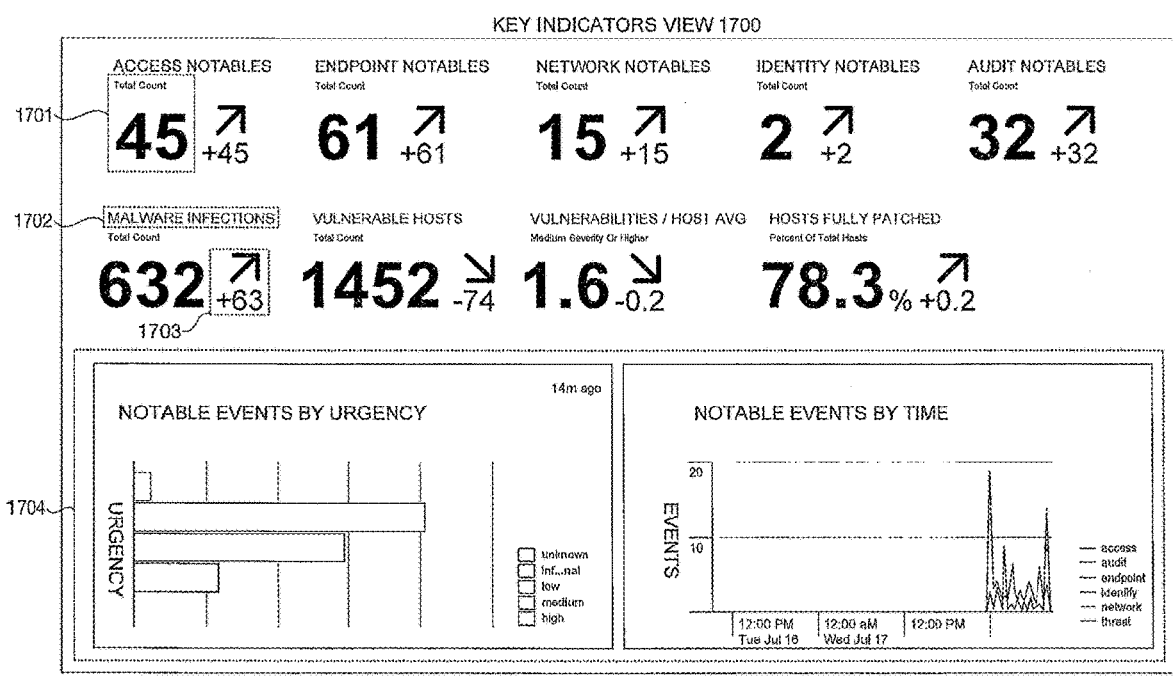
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
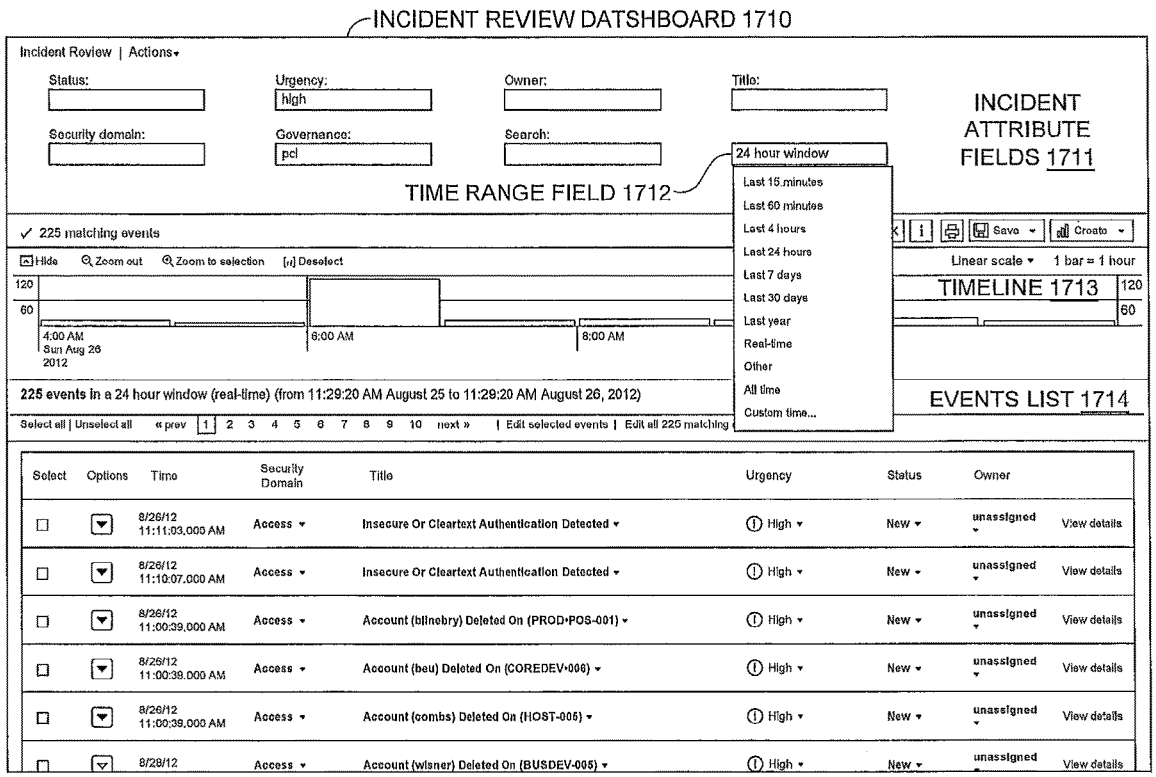
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developer's task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
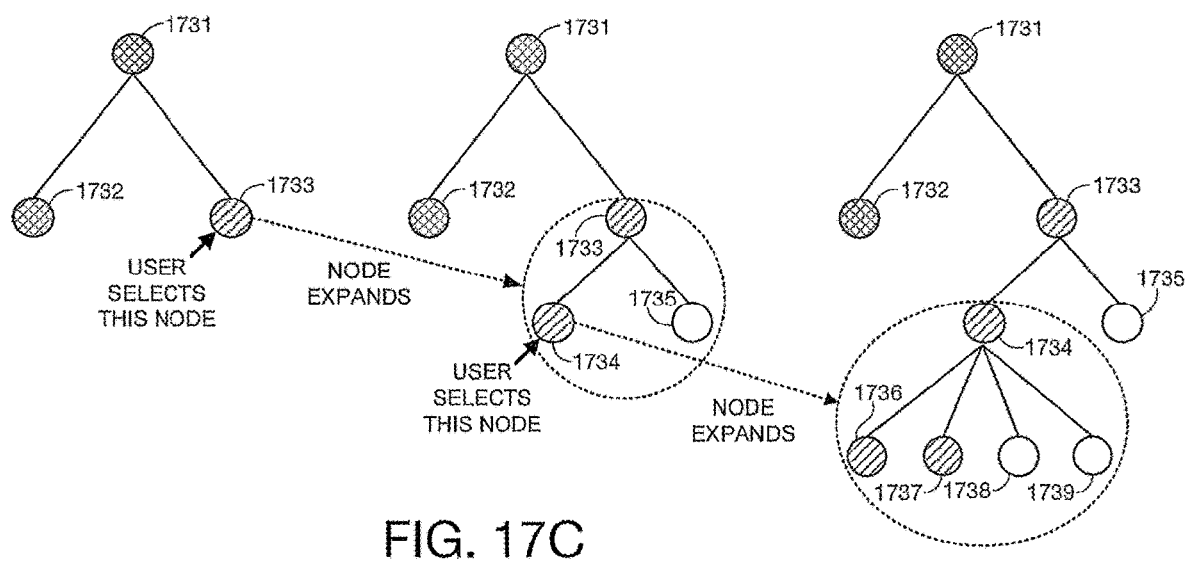
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
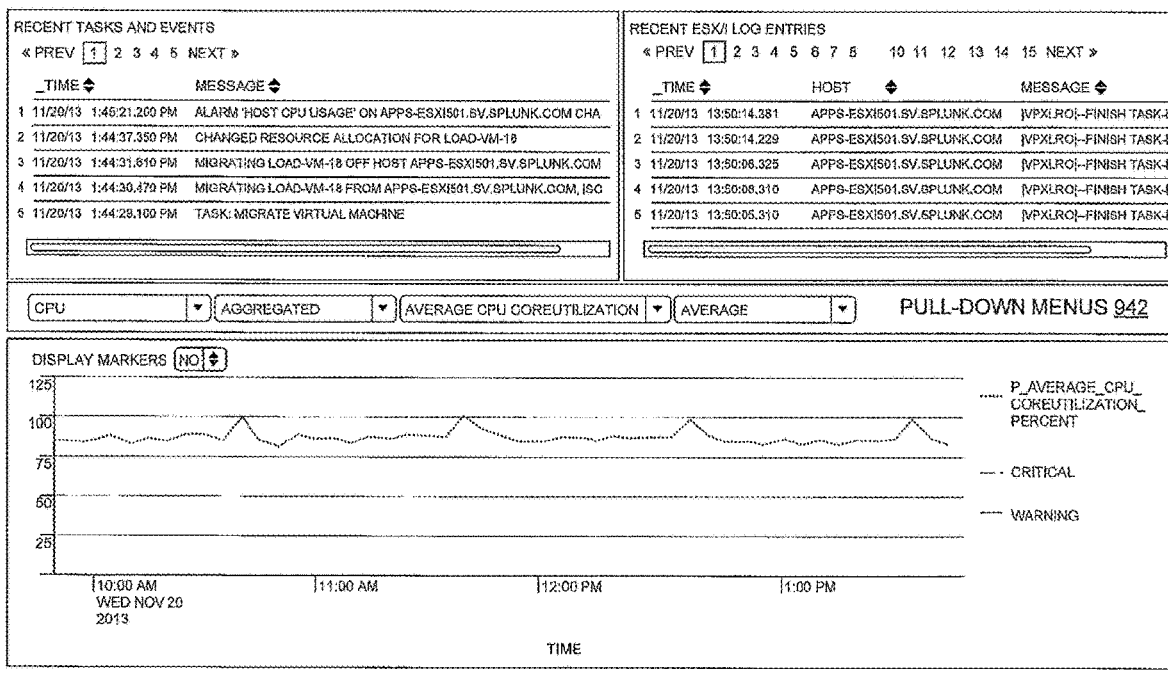
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

2.17. Multi-Tier Architecture

An architecture supporting multi-tier deployment may be advantageous in focusing the resources of an enterprise. An enterprise may have different system users, or groups of users, at different locations, with different roles and responsibilities. A multi-tier architecture may permit effective and efficient deployment of data input and query system (DIQS) instances with user-appropriate applications. DIQS instances supporting lower-tier, focused, work group oriented applications, for example, may be tailored to meet the specific needs of the associated application(s). Such tailoring may reduce installation size and operating burden both in terms of computing resources, space resources, and administrative overhead. Further DIQS instances for lower-tiers may be tightly packaged with a related lower-tier application, such that each is preconfigured for integrated operation with the other in an optimal way. Such integrated instances may all but eliminate administrative requirements for deployment that are not site-dependent.

Such lower-tier deployments may have interfaces to higher-tier deployments to reduce duplications of computing and human effort, to share functionality across the boundary, and to interoperate to provide feature integrations, for example. An illustrative example may be helpful. In the example, an enterprise may have deployed a lower-tier Entity Monitor application (EMA) that provides entity monitoring to a local workgroup of users tasked with the reliable operation of a bank of server racks. That same enterprise may have deployed a higher-tier service monitoring system (SMS) application that is used by the staff of a networks operation center to monitor major services provided by the enterprise information technology (IT) environment. (SPLUNK® IT SERVICE INTELLIGENCE™ is an example of such an SMS.) Enterprise email and customer-facing web page delivery may be examples of such services, and the services are performed by entities such as the servers in the racks monitored by the EMA. In the example enterprise, the deployed EMA may maintain a collection of entity definitions having information about the server entities, and the EMA may perform analytics against machine data pertaining to the entities a produce valuable metrics or representations reflective of the entities. Similarly, the deployed SMS may maintain its own collection of entity definitions having information about a broad set of entities including the server entities, and the SMS may perform analytics against machine data pertaining to the entities and produce valuable metrics or representations reflective of the entities in a broader context, such as the importance of an entity to maintaining the operation of a critical system service. The EMA and the SMS each has information the other does not, and may not be able to produce on its own, regarding an overlapping set of entities. Interfaces enable synergistic operational combinations.

In an embodiment, the lower-tier applications and the higher-tier applications interface to provide: one or more of mapped groupings of entities to the higher-tier services, both automatically and manually, business-level metrics which can be tied to data from the lower-tier application to create an end-to-end analysis of infrastructure impact on business outcomes; multiple lower-tier application instances together with other tools and custom data in the higher-tier application; identification of anomalous entities in the higher-tier application for correlation across the enterprise, improved interface at the higher-tier application for management of entities, and end to end navigation for monitoring and troubleshooting issues (service to entity).

In an embodiment, lower-tier monitoring applications integrate natively with the higher-tier application to provide one or more entity sharing, transition from services to entity metrics analysis, management and actions on alerts from entities in a Notable Events framework, and application of advanced machine language available in the higher-level monitoring application to entities for clustering and reliability forecasting.

Users, such as system administrators and site reliability engineers, for example, are tasked with maintaining the overall health, availability, reliability and performance of one or more entities within an enterprise system in an information technology (IT) environment. Each entity may be a computing device, a virtual computing device, a group of computing devices or a group of virtual computing devices at a specific site or multiple sites within the enterprise system. Typically, these users monitor approximately entities of 800 to 1,000 computing devices.

Lower-tier applications, programs, or solutions of an event-based data intake and query system provide an analytics driven tool for infrastructure monitoring and troubleshooting of the entities that represent a subset of the enterprise system. While a higher-tier application of an event-based data intake and query system, such as the SPLUNK® ENTERPRISE system developed by Splunk Inc. of San Francisco, Calif. can analyze machine data across the enterprise system, the lower-tier application searches the machine data from the entities and provides entity-level metrics related to the performance of the selected entities with the enterprise system.

Embodiments of the lower-tier application are directed to monitoring performance of an entity at an entity-level using key performance indicators derived from machine data from the entity. Implementations of the lower-tier application provide users with metrics related to the performance of a monitored entity within an enterprise system in an information technology environment. The lower-tier-tier application allows users to monitor entities from a bottom-up perspective and provide visualization to trouble shoot entity related issues.

In an embodiment, lower-tier applications provide an analytic-driven IT operations tool that unifies metrics and logs for trouble shooting and monitoring hybrid IT infrastructure.

In a further embodiment, the lower-tier applications are single team focused and provide simple tagging and grouping, reliability scoring on entities and groups anomaly detection and adaptive thresholding for easy tuning; 24 hours of alerts and notifications with ability to mute alerts; metrics analysis workspace built into product; in-application collection guidance; self-service, and easy deployment.

In an embodiment, the lower-tier applications and the higher-tier applications interface to provide one or more of map groupings of entities to the higher-tier services, both automatically and manually, business-level metrics which can be tied to data from the lower-tier application to create an end to end analysis of infrastructure impact on business outcomes; multiple lower-tier application instances together with other tools and custom data in the higher-tier application; identification of anomalous entities in the higher-tier application for correlation across the enterprise, improved interface at the higher-tier application for management of entities, and end to end navigation for monitoring and troubleshooting issues (service to entity).

In an embodiment, lower-tier monitoring applications integrate natively with the higher-tier application to provide one or more entity sharing, transition from services to entity metrics analysis, management and actions on alerts from entities in a Notable Events framework, and application of advanced machine language available in the higher-level monitoring application to entities for clustering and reliability forecasting.

In some embodiments, the lower-tier application does not permit clustering. Further, the user is not permitted to write applications that use the search engine, but is provided with graphic user interfaces for visualization of the entity-level metrics. The lower-tier applications comprise a single use, single channel solution.

Lower-tier applications may generally be considered to have more focused functionality than a higher-tiered application. Accordingly, a data input and query system (DIQS) with the functionality to sustain a higher-tiered application has no difficulty sustaining a lower-tiered application. However, it may be advantageous for a DIQS deployment strictly supporting a lower-tier application, or applications, to have no more complexity than what is required to support those lower-tier applications. Such a tailoring of the DIQS may simplify deployment, and reduce ongoing administration and overhead and operational costs.

Figure 18:
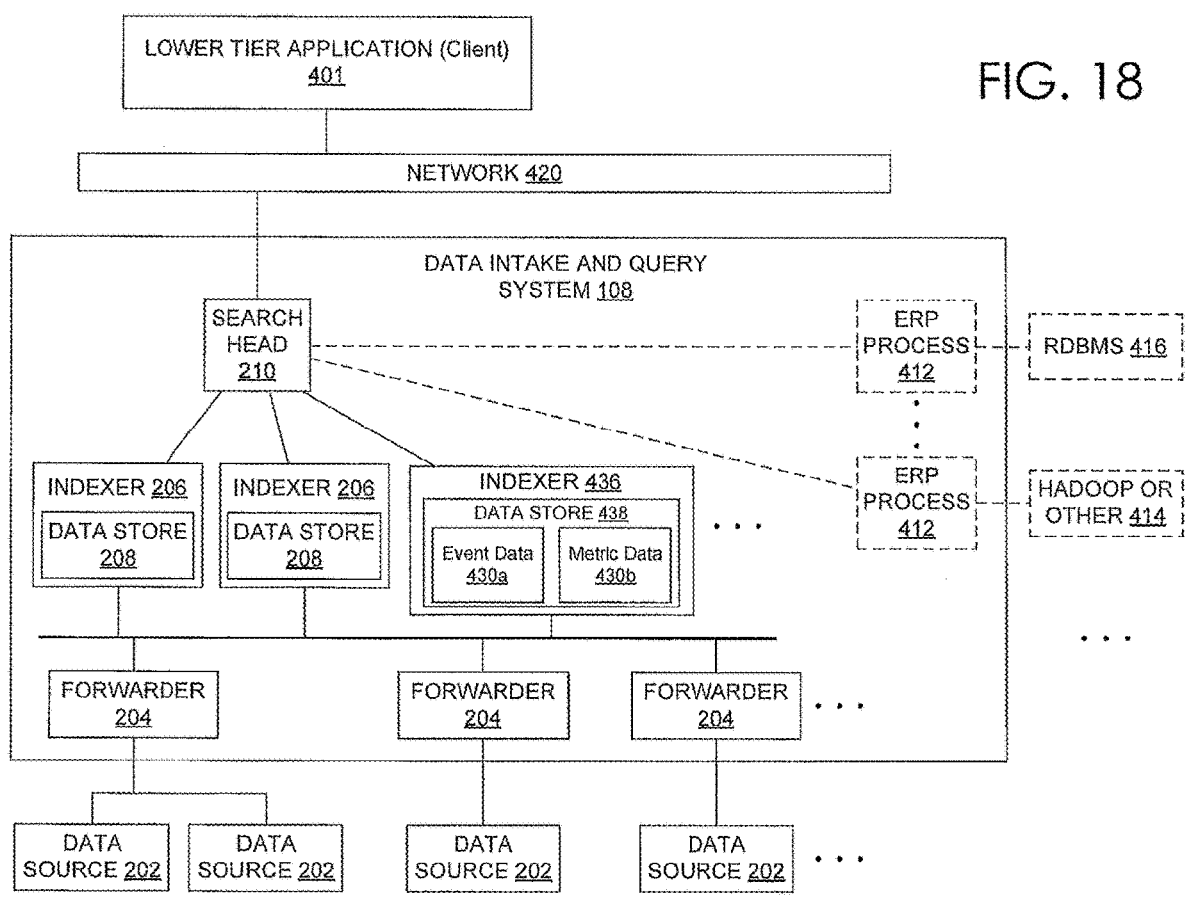
FIG. 18 is a block diagram of an example of a data intake and query system that supports the application level functionality of a lower-tier application, in accordance with example embodiments.

FIG. 18 shows a block diagram of an example of a data intake and query system 108 that supports the application level functionality of a lower-tier application in one embodiment. FIG. 18 represents an adaptation of the data input and query system 108 of FIG. 4 and like elements have common numbering as between the two figures, and the descriptions thereof are not repeated here. Notable differences for the example embodiment illustrated in FIG. 18 are described now. Client devices 404*a*, 404*b*, and 404*n*, of FIG. 4 are replaced in FIG. 18 by lower tier application 401 which acts as the client in relation to the underlying data input and query system (DIQS) 108. High functionality, direct user access to the underlying DIQS may generally not be provided. The DIQS may be adapted, supplied, configured, and provisioned to effect support for requests presented by the lower tier application, in an embodiment. As one example, DIQS 108 of FIG. 18 may exclude support for External Result Provider (ERP) processing as indicated by the dashed lines around and connecting ERP processes 412, RDBMS ERP 416, and Hadoop ERP 414. In one embodiment, a developer or provider of the lower-tier application may configure the DIQS functionality to only include what is required by the lower-tier application, perhaps through a user interface directed to building a customized DIQS configuration instance. In one embodiment, a customized DIQS instance may be able to be shared by a number of lower-tier applications such as 401.

In comparison to the DIQS 108 of FIG. 4, the DIQS 108 of FIG. 18 is shown to also include indexer instance 436 having data store 438. Indexer 436 and data store 438 operate just as described for indexers 206 and data stores 208 of FIG. 4—and any indexer 208 and data store 208 may comport with the details next described for indexer 436 and data store 438 of FIG. 18. Indexer 436 of FIG. 18 when processing the data of its associated data store 438 may distinguish and discriminate between different types or classes of data in its data store. Data store 438 is shown to include Event Data 430*a* storing data of an event data type and Metric Data 430*b* of metric data type. Event type data is already described in detail elsewhere in this written description. Metric type data may be data that is characteristically small per occurrence, high in volume, primarily numeric, and perhaps highly structured. An example of data with those characteristics may be performance or parameter measurements being constantly reported by networked devices such as computing machines in information technology environments, automated machinery on the shop floor of a factory, or sensors on the windmills of an energy farm. An indexer such as 436 having multiple data type capability may use functional processing specialized to the data type when responding to requests from search head 210 or receiving data from a forwarder 204. For example, indexer 436 may use different processing to effect the formatting, storage, indexing, retrieval, consolidation, aggregation, and such, of metric type data than it does for event type data in order to maximize or optimize the processing of each type of data to improve overall DIQS performance and functionality. Lower tier application 401 may invoke the processing of DIQS 108 for multiple types of data and, in one embodiment, the types of data supported by the indexers (206, 436) may be configurable for an instance of DIQS 108 customized to the lower tier application. These and other embodiments are possible.

Embodiments of the higher-tier application are directed to monitoring performance of a system at a service-level using key performance indicators derived from machine language. Implementations of the higher-tier application provide users with metrics related to the performance of a monitored service, such as services pertaining to an information technology environment. The higher-tier application allows users to monitor services from a top-down perspective and provide through customizable graphic user interfaces visualization to trouble shoot service related issues. Higher-tier applications permit clustering and users are permitted to create customer applications that use the search engine.

One example of a higher-tier application is an IT monitoring application, such as SPLUNK® IT SERVICE INTELLIGENCE™, which performs monitoring and alerting operations. Appendix A includes U.S. Patent Publication No. US2017/0147681A1, entitled "Portable Control Modules in a Machine Data Driven Service Monitoring System, filed on Jan. 9, 2017, which provides robust description of the IT SERVICE INTELLIGENCE™ higher-tier application.

2.18. Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0. KPI Prediction and Impactors

An IT service monitoring system as already described transforms machine data about a monitored IT environment into new and more useful data constructs that may be used, for example, to direct automated operations of the monitoring system and to generate the kind of meaningful information displays a user desires such a system to produce. Implementations of data aggregations of key performance indicators (KPI's) and Health Score values for the monitored services of an IT environment may be useful to automated processes that adjust the size of an elastic execution environment or that generate information presentations of current and historic states and trends, for example. Aspects of the service monitoring system operation that generate and utilize such transformations may include monitoring aspects that regularly determine operational states or measures, reporting aspects that surface important or relevant service-related information to users or other automated processes, remedial aspects that may themselves include investigative aspects that automatically identify, gather, collect, concentrate, transform, visualize, present, or otherwise process information for investigative processes and remediation aspects that automatically invoke system actions or workflow steps to remedy, correct, improve, ameliorate, or otherwise adjust some suboptimal condition. Inasmuch as a value of a monitoring system is for the early detection and correction of suboptimal conditions, an advanced monitoring system may push "early" to "even before it happens" if reliable and useful predictions can be determined automatically.

Such an advanced monitoring system, particularly one for monitoring the services operationally delivered by an information technology (IT) environment, may implement an embodiment of KPI prediction and/or impactor determination, as next described through examples, to provide a superior monitoring system. The benefits to those operating the system environment monitored by the SMS are clear, but substantial technological benefits arise from such an SMS, itself. As problems in a monitored environment proceed they often expand and thereby increase the processing burden (and computing resource costs) of the SMS, for example, as may result from an increasing number of error messages and metrics from an increasing number of devices. Moreover, the spread of the problem across monitored elements, representations thereof, and derivations therefrom, can result in a greater demand for user interface processing. While interacting users, themselves, are relatively slow in technology timeframes, their slowness unintuitively places high computing resource demands on an SMS. As one example, persisting states of an interactive user session between user inputs consumes computer storage and the processing resources to manage and move those states within a storage hierarchy despite being programmatically accessed for only a very small percentage of its lifetime. Further, user interface processing may frequently be involved in the initiation of on-demand processing, each instance of which increments the SMS computing resources demand over its automated baseline operation levels, perhaps substantially. An SMS producing and delivering accurate prediction profiles in a focused way is therefore able to reduce the computing resources costs of the system operation. These and other advantages will be clear by consideration of the description that follows.

Figure 19:
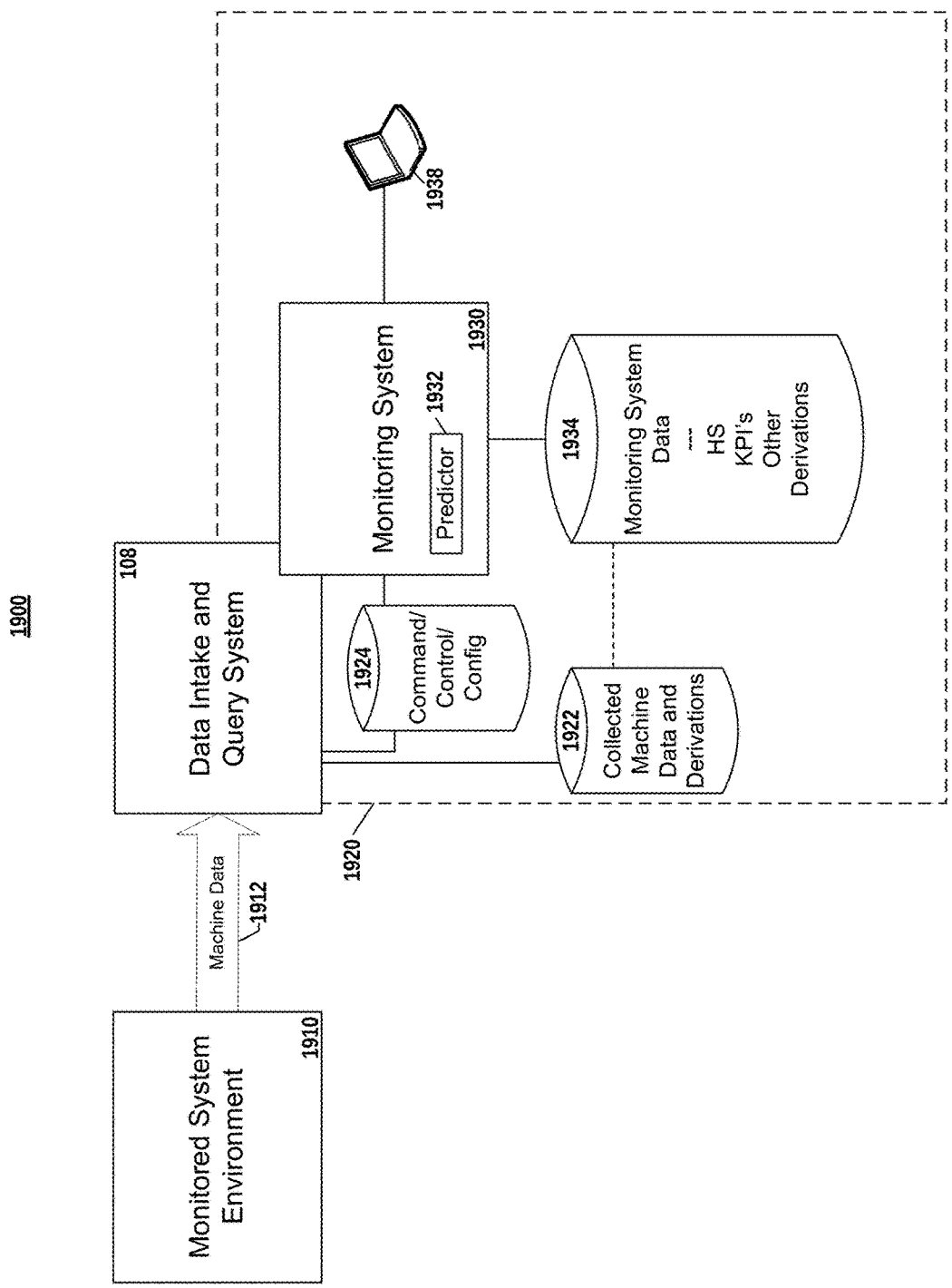
FIG. 19 depicts an operating environment embodiment as may benefit from the practice of disclosed aspects of KPI prediction and/or impactor advice determination.

FIG. 19 depicts an operating environment embodiment as may benefit from the practice of disclosed aspects of KPI prediction and/or impactor determination. Environment 1900 of FIG. 19 is shown to include monitored system environment 1910, data intake and query system (DIQS) 108, monitoring system 1930, user interface device 1938, command configuration and control (CCC) data store 1924, machine data and derivations data store 1922, and monitoring system data store 1934. Monitored system environment 1910 represents an operational information technology (IT) environment as may be implemented by a business enterprise, for example. Ongoing operation of the monitored system environment 1910 produces machine data 1912 that reflects its operation. Machine data 1912 may originate from multiple sources in and appurtenant to the monitored system environment and may include a wide variety of data having different formats, different representations, different content, and different degrees of structuring from unstructured through highly structured, for example. Machine data 1912 about the monitored system environment 1910 is ingested by DIQS 108 where it is processed and represented among the data of collected machine data and derivations data store 1922 where it is susceptible to search processing. An example of a DIQS system is the aforementioned SPLUNK® ENTERPRISE system developed by Splunk Inc. of San Francisco, Calif. In an embodiment, the ingestion of machine data 1912 by DIQS 108 may be controlled, directed, or conditioned by information of command/configuration/control data store 1924.

DIQS 108 of the illustrated embodiment is shown to be operatively coupled with command/configuration/control (CCC) data store 1924. CCC 1924 may include information that directs, controls, determines, or the like, operational processing performed by DIQS 108. In a sense, CCC data store 1924 in combination with the hardware and/or software of DIQS 108 that accesses information of CCC 1924 to condition DIQS operations, and the hardware and/or software of DIQS 108 that provides an interface for establishing and/or maintaining the contents of CCC data store 1924, operates as the control panel for DIQS 108 where a traditional control panel of a simpler system or appliance with all its knobs, buttons, switches, lights, LEDs, gauges, numeric displays, and the like, cannot suffice. In one embodiment, hardware and/or software of DIQS 108 that provides an interface for establishing and/or maintaining the contents of CCC data store 1924 (not distinctly shown) may include graphical user interfaces (GUIs) to visualize certain contents of CCC data store 1924 and provide interactive elements enabling a user to add or change the content of data store 1924. In one embodiment, a RESTful interface may be employed. In one embodiment, a graphical user interface may include depictions of physical buttons, gauges, indicators, and the like, to display CCC data and effect its change. Many embodiments are possible. Inasmuch as monitoring system 1930 may utilize CCC data to direct its operational processing, monitoring system 1930 is shown to be operatively coupled to CCC data store 1924. In an embodiment, each system or component may use dedicated or shared functionality to establish and/or maintain relevant contents of the CCC data store. In an embodiment, each system or component may use a dedicated or shared CCC data store, and may use the data of one or more CCC data stores to determine and direct its operation. Accordingly, one of skill understands that CCC data store 1924a of FIG. 19 represents the logical collection of CCC data employed by the functional hardware and/or software of systems and/or components to which it is shown to be connected, without any limitation as to the logical and physical organization, representation, and storage. Many embodiments are possible.

Monitoring system 1930 may include functionality to monitor and report on the monitored system environment 1910 based at least in part on performing query and programmatic processing to transform collected machine data and derivations 1922 of the monitored system 1910 accessed via DIQS 108 into new and more meaningful data values, components, collections, and structures useful to the automated processing of monitoring system functions, both those having and those without a user interface component. Such data produced by the operation of monitoring system 1930 may be reflected in computer storage as monitoring system data 1934. Monitoring system data 1934 may include, for example, health scores for the services implemented by environment 1910 and monitored by system 1930, key performance indicators (KPIs) that each may reflect a particular measure of performance of some aspect of one of the monitored services, other transient and/or persistent data produced during the operation of monitoring system 1930, and derivations of the aforementioned, such as summaries, condensations, statistical products, reorganizations, normalizations, for example. In an embodiment, monitoring system 1930 may invoke the functionality of DIQS 108 to store and access monitoring system data 1934 and, accordingly, monitoring system data 1934 may represent a subset of the collected machine data and derivations 1922 as indicated by the dashed line between them in FIG. 19. In one embodiment, monitoring system 1930 may be loosely coupled with DIQS 108, be packaged or sourced independently, and interact with DIQS 108 only through defined, external, exposed application programming interfaces (APIs). In one embodiment, monitoring system 1930 may be more closely coupled with DIQS 108, be packaged as an application running within a framework provided by DIQS 108, and interact with DIQS 108 through many mechanisms. In one embodiment, the functionality of DIQS 108 may be integrally packaged as a sub-component of monitoring system 1930 with or without any external exposure of functional DIQS APIs. Such an integrated or closely coupled monitoring system implementation is represented in FIG. 19 by dashed box 1920.

The aforementioned SPLUNK® IT SERVICE INTELLIGENCE™ developed by Splunk Inc. of San Francisco, Calif., is an example of a commercially available monitoring system such as 1930 and, particularly, includes the functionality for a service monitoring system (SMS) capable of monitoring services implemented in the monitored system environment 1910. A robust description of the design, function, operation, and features as may be usefully implemented in an SMS such as SPLUNK® IT SERVICE INTELLIGENCE™ is found in U.S. patent application Ser. No.

15/713,606, filed Sep. 23, 2017, entitled "AUTOMATIC ENTITY CONTROL IN A MACHINE DATA DRIVEN SERVICE MONITORING SYSTEM", and published as U.S. Patent Application Publication No. US20180024901A1 on Jan. 25, 2018, which is hereby incorporated by reference in its entirety for all valid purposes. A reference SMS assuming many of the design, feature, and functionality aspects described in the foregoing patent application may usefully serve as an example SMS by which to illustrate the inventive disclosures that follow. Accordingly, the foregoing patent application may be referred to herein as the reference SMS disclosure, and one of skill may wish to consider its contents in the entirety. More particularly, and not comprehensively, one of skill may wish to refer to specific content of the reference SMS disclosure for illumination of possible implementations and embodiments as regards specific topics included in the discussion below. Accordingly, a reference SMS comporting with the reference SMS disclosure is next briefly described and topical content is identified.

A reference SMS comporting with the reference SMS disclosure may use machine data ingested from the environment, maintained, and exposed for search processing by a data intake inquiry system (DIQS) as a principal input to its service monitoring functions. The reference SMS may represent an environment it monitors in terms of a related set of service, entity, and KPI definitions. An entity definition may represent a component in the operating environment and include information to identify machine data of the DIQS pertaining to the entity. A service definition may identify a service delivered by the monitored environment and may have an association with the one or more entity definitions that represent the operational entities that perform the service. A KPI definition may specify a search of machine data of the DIQS pertaining to the entities that perform a particular service to produce a value indicative of some measure of the particular service, perhaps a performance measure. Many KPI definitions may be associated with a particular service to produce measurements for different aspects of the service. Additionally, an overall health score may be produced for the service to represent some measure of the health, goodness, wellness, desirability, or such, of the service on the whole. In an embodiment, the health score of a service may be produced from the values for a number of its KPIs, perhaps all, substantially all, most, all active, all participating, or all selected of its KPIs, and may be designated in an embodiment as an aggregate KPI.

In regards to architectural aspects of a reference SMS the reader may consider FIGS. 2-5 and the related discussion of the reference SMS disclosure, for example. In regards to entities and their definitions of a reference SMS the reader may consider FIGS. 6-10Z and the related discussion of the reference SMS disclosure, for example. In regards to services and their definitions of a reference SMS the reader may consider FIGS. 11-17C and the related discussion of the reference SMS disclosure, for example. In regards to KPIs and their definitions of a reference SMS the reader may consider FIGS. 19-27 and the related discussion of the reference SMS disclosure, for example. In regards to a state, condition, attribute, or such, associated with a KPI value in time via thresholding mechanisms to determine the severity states of example embodiments, the reader may consider FIGS. 28-31F and the related discussion of the reference SMS disclosure, for example. In regards to dependencies between and among services as may be represented by a service topology the reader may consider FIG. 34ZA2 and the related discussion of the reference SMS disclosure, for example. In regards to an urgency, weight, or importance value associated with the KPI of a reference SMS the reader may consider FIG. 29C (particularly 2962) and the related discussion of the reference SMS disclosure, for example. In regards to a service health score or aggregate KPI for a service of a reference SMS the reader may consider FIGS. 32-34A and the related discussion of the reference SMS disclosure, for example. In regards to a user interface display including parallel graph lanes for a common timeframe the reader may consider FIG. 54 (more broadly, FIGS. 50A-55A) and the related discussion of the reference SMS disclosure, for example. In regards to a user interface display including a layout of widgets which may serve as vehicles for the display of SMS data such as KPI values or health scores the reader may consider FIGS. 35-47C and the related discussion of the reference SMS disclosure, for example.

Monitoring system 1930 of FIG. 19 is shown to include predictor component 1932. Predictor component 1932 includes functionality that includes making forward-looking predictions, forecasts, or estimates of performance measures, events, or conditions related to services monitored by monitoring system 1930. Predictor component 1932 may more broadly belong to a remediation component (not shown) of monitoring system 1930 of one embodiment. Monitoring system 1930 may include functionality identifiable as a monitoring and reporting component of the system in an embodiment. One aspect of operation of such a monitoring and reporting component may be to identify current or projected suboptimal events or conditions in the monitored system environment 1910. Suboptimal events or conditions surfaced by the monitoring or reporting component may be subjected to processing by a remediation component (not shown) of monitoring system 1930 which provides functionality to investigate and/or remedy the suboptimal state. Many embodiments, classifications, and organizations of monitoring system functionality are possible. Predictor component 1932 may include, direct, or facilitate the KPI prediction and impactor identification mechanism subsequently described.

Figure 20:
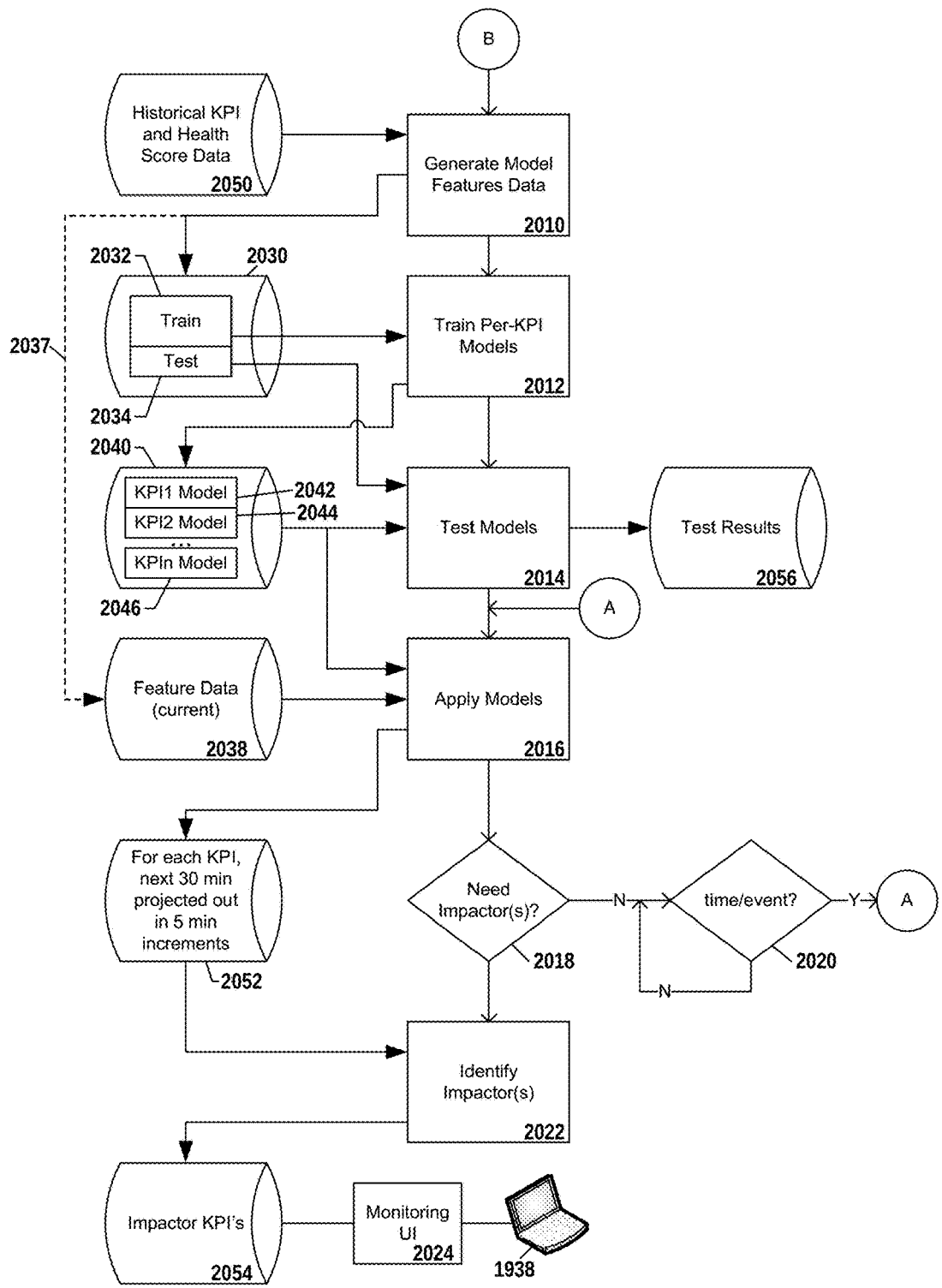
FIG. 20 depicts a system processing flow diagram for KPI prediction and impactor identification in one embodiment.

FIG. 20 depicts a system processing flow diagram for KPI prediction and impactor identification in one embodiment. The depicted example embodiment determines future KPI values by processing current or recent data in accordance with a prediction model. (Note that if using such processing retrospectively, the current or recent data may be current or recent relative to the historic time frame addressed by such processing.) The processing depicted by FIG. 20 includes processing to generate feature data for the training, testing, and use of the models, processing to create the set of models used in the embodiment, processing to test those models, and processing to apply those models to produce useful predictive values. The processing depicted by FIG. 20 further includes processing to utilize those predictive values to identify KPIs (and by implication certain operating components of the monitored environment) likely or most likely to impact a future measure of service performance, perhaps in a ranked way, and perhaps as a focused subset. The results may be presented to other SMS processing or to the analyst/user to prospectively remedy, i.e., prevent or attenuate, a suboptimal future condition, for example.

The processing of process flow 2000 of FIG. 20 is shown to begin at block 2010 where feature data for predictive models is generated. The processing of block 2010 is shown to include receiving historical KPI and health score data from data store 2050. An example used to illustrate the processing of process flow 2000 is discussed in terms of a service-level measure, i.e. the service health score, and so data relating to a single service is discussed in order to avoid burdening the illustration with unnecessary detail. The historical KPI and health score data received at block 2010 is processed to generate feature data instances in train/test feature data store 2030. In one embodiment, each generated feature data instance includes each of the features used to develop models at block 2012. In one embodiment, each generated feature data instance includes an identical set of features. In one embodiment, each generated feature data instance includes only feature values. In one embodiment, each generated feature data instance includes feature values and metadata describing the instance. Many embodiments are possible. As discussed here, a feature obtains in its usual artificial intelligence (AI) and machine learning (ML) sense which may be stated as an individual measurable property or characteristic of a phenomenon being observed, or such. In an embodiment, KPI values, health scores, and derivatives thereof may be the measurable properties or characteristics, and service performance may be the phenomenon being observed.

Embodiments may vary as to the amount of historical KPI and health score data used by the processing of block 2010 to generate the feature instance sets of 2030. Embodiments may use one hour, 12 hours, one day, three days, one week, two weeks, one month, three months, six months, or some other time period worth of input data to generate the feature instance sets of 2030. Training features instances set 2032 and test features instances set 2034 may be produced separately or together. In one embodiment, the input data to processing block 2010 is processed into a single set of features instances which is then divided into separate training 2032 and testing 2034 features instances components. In one such embodiment, the single set of features instances is divided according to a desired proportion, for example, where training gets 90% and testing gets 10% of the features instances generated by 2010, or training gets 70% and testing gets 30% of the features instances. In one such embodiment, the single set of features instances may be divided between the training 2032 and testing 2034 components based on their logical position within the set, for example, where training gets the first 90% of features instances and testing gets the remainder. In one such embodiment, the single set of features instances may be divided between the training 2032 and testing 2034 components based on a random selection or other sampling method. Many embodiments are possible.

An illustrative example of a features instance as may be generated by the processing of block 2010 in one embodiment is later discussed in relation to FIG. 21. In an embodiment, the SMS may include all of the logic to transform the data of 2050 into the features instances of 2030 useful for model development and subsequent processing. In an embodiment, the SMS may utilize external services, such as the search processing of a DIQS to perform much of the work represented by block 2010. These and other embodiments are possible. When the processing of block 2010 has adequately completed the features instances of 2030, processing may proceed to block 2012.

At block 2012, trained models are produced for each KPI involved. In one embodiment, all KPIs directly associated with the service under consideration are involved. Each such directly associated KPI may have a value that represents some measure of the service. In one embodiment, a selection of KPIs directly associated with the service under consideration are involved. Manual or automated methods may be used to determine the selection. In one embodiment, all KPIs directly associated with the service under consideration and reflecting one or more particular attribute values are involved. Examples of such attributes may include an active/inactive attribute, and engaged/suspended attribute, a production/development attribute, and activated/staged attribute, a deprecation attribute, a health score factor attribute, and others. In one embodiment, all KPIs directly associated with the service under consideration and having some threshold level of actual measurement data present in the historical KPI and health score data 2050 are involved. Examples of such threshold levels may include a minimum count of recorded KPI values in the input data (such as 5000), a minimum percentage of expected KPI values recorded in the input data based on KPI production frequency (such as 70%), a minimum number of most recent time periods represented in the input data for which the KPI has values recorded (such as 15 days), and others. In one embodiment, some number of KPIs directly associated with the service under consideration and at least one KPI reflecting a different service on which the service under consideration is dependent (indirectly associated) are involved. Examples of such at least one KPI reflecting a different service may include the top KPI of each service on which the service under consideration is dependent based on some ranking criteria, the top two KPIs of each service on which the service under consideration is dependent based on some ranking criteria, all KPIs of each service on which the service under consideration is dependent that have been selected or identified by manual or automatic means as having or likely having a relationship to the health score of the service under consideration, and others. Many embodiments are possible.

In one embodiment, the processing of block 2012 includes training a model of a model category, class, or type, against the relevant instances of training features instances data component 2032 to produce a predicted future value for each particular one of the involved KPIs. The predicted future value may comport with a prediction timeframe that specifies the distance in time beyond the latest of its input data for which the trained model produces its predicted future value when applied. An embodiment may use a prediction timeframe of one minute, two minutes, five minutes, 10 minutes, 15 minutes, 30 minutes, 60 minutes, or another value, for example. An embodiment such as the example that will generally be described here may use a prediction timeframe of 30 minutes, meaning that when a trained model is applied using the most recent data (t=now) the predicted value produced by the model represents what is expected 30 minutes from now (t=now+30 min).

In one embodiment the category, class, or type of the model trained during the processing of block 2012 is built into the SMS and does not change. In one embodiment the category, class, or type of the model trained during the processing of block 2012 is selected by the user from a list of available options. In such an embodiment, the selection by the user may be made each time the processing of block 2012 is performed. In such an embodiment, the selection by the user may be made prior to the processing of block 2012 and reflected in the command/configuration/control information of the SMS. In one embodiment, the category, class, or type of the model trained during the processing of block 2012 is dynamically determined during the processing of block 2012, perhaps by running some or all of the training data for some or all of the involved KPIs against some variety of the available model types and determining by some measure which model type produced the most desirable result. Many embodiments are possible.

In an embodiment, models in the regressor category or class may be used. Linear regression, gradient boosting, and random forest are known model types in the regressor category that may be employed in an embodiment. Models of other categories, classes, and/or types may be used in an embodiment and one of skill may choose models deemed best to represent the input features, the output type, and any other factors. Many embodiments are possible. Further, one of skill will understand how to adapt the processing depicted in FIG. 20 and elsewhere when the choice of model recommends it. For example, in an embodiment where a model of the neural network category or class is used that is capable of producing all of the predicted KPI values as an output of a single model, the per-KPI iterations of processing discussed in relation to the illustrated example can be collapsed.

When the processing of block 2012 is completed model data store 2040 of this example embodiment contains a trained model for each of the involved KPIs that, when applied to a feature instance predicts a value for the respective KPI moving forward in time by the amount of the prediction timeframe. Trained model data store 2040 is shown to include a model for an example KPI1 2042, a model for example KPI2 2044, and a model for example KPIn 2046, where KPIn represents the last of the involved KPIs. In an embodiment, the processing of block 2012 may complete before processing proceeds to block 2014.

At block 2014, the models produced at block 2012 are tested as a quality assurance operation. In an embodiment, the processing of block 2014 applies each of the models of completed model data store 2040 against the relevant features instances of test component 2034 of data store 2030. Results of the testing performed by the processing of block 2014 may be recorded as test results 2056. The test results produced by the processing of block 2014 may include some measure of the quality of the prediction each model produces against the data to which it was applied in view of the actual values for the predicted times known from the historical record. In one embodiment, the measure of quality may involve a determination of one or more extreme deviations of predicted values from the known actual values. In one embodiment, the measure of quality may involve a determination of an average deviation of predicted values from the known actual values. In one embodiment, the measure of quality may include consideration of factors including prediction accuracy, computing cost, distribution of error, R-squared determinations, root mean square error (RMSE) determinations, F1-score determinations, confusion matrices, and others. Many embodiments are possible.

In an embodiment, test results 2056 may be utilized by processing of the SMS (not shown) to condition processing based on the test results. For example, successful test results by some measure may result in the SMS tagging each model of 2040 with attribute data indicating a state of readiness, usability, validation, or such. For example, unsuccessful test results by some measure may result in the SMS re-engaging the processing of 2012 with one or more adjustments aimed at producing a set of models 2040 that successfully pass the testing of block 2014. For example, information of test results 2056 may condition the generation of a user interface (UI) display presenting test results information to an analyst/ user such that the data of test results 2056 is visualized to the user and one or more visual aspects of the presentation of data items, such as color, are determined based on test result values when generating the UI for display. Such a UI may include interactive components enabling a user to indicate a processing direction, acceptability of the test results, or other factors in view of the test results. Many embodiments are possible. In the example embodiment, after the processing of block 2014 produces test results 2056 deemed acceptable or successful, processing proceeds to block 2016.

In one embodiment, the training and testing processing of blocks 2012 and 2014 that build and/or refresh the trained models of 2040 may be performed with great frequency even to the point of refreshing the models before every application of the models as subsequently discussed in relation of block 2016. In one embodiment, the model build/refresh processing may be performed on a timed basis according to a frequency (e.g., every three days, 30 days, 90 days, etc.), or a schedule (e.g., Tuesday and Saturday nights between 2:00 and 4:00 AM). In one embodiment, the trained models of 2040 may have an expiration date and the model build/refresh processing may be timed according to the expiration of existing models. In one embodiment, the model build/refresh processing may be event driven such as by being automatically performed at some point after a new KPI has been defined for the service under consideration and is producing values. In one embodiment, the model build/ refresh processing may be initiated in response to receiving inputs indicating user interaction with a user interface. In an embodiment, the timing of the model build/refresh processing may be based on some combination of the foregoing or other factors. Many embodiments are possible.

At block 2016, the models of trained model data store 2040, produced by the processing of block 2012 and tested by the processing of block 2014, are applied to instances of feature data from 2038. The instances of features data 2038 are indicated by dashed arrow 2037 to be produced by the processing of block 2010. This representation indicates that the fundamental process of converting KPI and health score data such as 2050 to features instances for model processing may be substantially the same in regards to the production of training/testing features instances data 2030 and apply-time features instances data 2038, despite the fact that the amount and time frames of KPI and health score data put into the process and the number of features instances coming out of the process may differ. In one embodiment, the processing of block 2010 may run on a continuous basis, regularly converting recent KPI and health score data into features instances that are accumulated over time. In such an embodiment the processing of 2012 may draw on a large swath past features instances in the accumulation while the processing of block 2016 may draw on only the most recently accumulated features instances. In one embodiment, the processing of block 2010 may run on an on-demand basis, reaching into the historical KPI and health score data 2050 to get as much data from the proper time frames as needed to produce the features instances necessary for the task at hand. Many embodiments are possible.

In the illustrated embodiment, the processing of block 2016 is shown to produce KPI prediction data 2052, which in this illustrative example is indicated to be a predicted value for every five minutes in the next 30 minutes (six predictions) for each involved KPI. The processing of block 2016 is discussed more fully below in relation to FIG. 22.

At block 2018, a determination is made whether impactors (here, impactor KPIs) need to be identified. If not, processing proceeds to block 2020 where it is determined whether a time or event has occurred that indicates the models should once again be applied to presumably more current data, i.e., features instances. If so, processing proceeds again to block 2016 where the models are once again applied. If not, processing remains at block 2020 awaiting the occurrence of the time or event. In one embodiment, the determination of block 2020 is based on a time interval corresponding to a features instance data interval or time increment of the embodiment. Other times may be used. In one embodiment, the determination of block 2020 is based on an event, the event being the reception of user input indicating the performance of the model application processing represented by block 2016. Many embodiments are possible.

If the determination is made at block 2018 that impactors need to be identified, processing proceeds to block 2022. In one embodiment, the determination of block 2018 is made based at least in part on a predicted future health score for the service. In one embodiment, if the predicted future health score falls below a particular threshold, the processing of block 2018 determines that an identification of impactors is needed. In one embodiment, if the predicted future health score moves from the current health score in an unfavorable direction by a threshold amount or more, the processing of block 2018 determines that an identification of impactors is needed. Many embodiments are possible.

In one embodiment, a future health score may be predicted largely after the fashion described for the prediction of future KPI values, particularly inasmuch as a health score may be derived from KPI values and in many contexts may share the same important attributes as KPIs. In one embodiment, a future health score may be predicted in a fashion distinct from that described for future KPI values. For example, in one embodiment, service health score prediction may begin with creating training and testing feature data for a regression model where each tuple or instance of feature data includes: a timestamp or equivalent reflecting the base or current time for the tuple; a value for the health score that occurred beyond the current time by the amount of a prediction timeframe (e.g., 30 minutes); a value for the health score at the current time; and a value for each of the KPIs identified as involved, perhaps all of the KPIs directly associated with the service that are actively producing data. Subsequently, in this embodiment, multiple different models may be determined by performing a training operation using the training feature data. The multiple different models may be scored based on some measure of model quality, perhaps using the testing feature data, and the highest scoring model may be used on a production basis to produce predicted health score values in real-time or near real-time. Many embodiments are possible.

Processing flow 2000 of FIG. 20 as depicted indicates that the predicted KPI values 2052 are an input to the processing of block 2022 that identifies impactors. Similarly, a representation of identified impactor KPIs in computer storage as indicated by block 2054 is an output of the processing of block 2022. The processing of block 2022 is discussed more fully below in relation to FIG. 23.

Processing flow 2000 of FIG. 20 shows that the identification of impactor KPIs 2054 is an input to the processing of block 2024. The processing of block 2024 represents processing of the SMS that uses and/or is conditioned by data representing the identification of impactor KPIs, including, possibly, user interface (UI) processing. In one embodiment, SMS processing of 2024 may automatically produce a collection of relevant data related to the identified impactors and/or an unfavorable predicted health score that may have caused their identification, where the selection, sources, and/or types of data collected are determined by reference to the impactor identification information. In such an embodiment, further SMS processing may utilize the collection of relevant data in the course of generating and causing display of an investigative/remediation user interface, perhaps via user interface device 1938, that facilitates preemption, foreclosure, minimization, or such of unfavorable future conditions in the example monitored IT environment. Many embodiments are possible.

Figure 21:
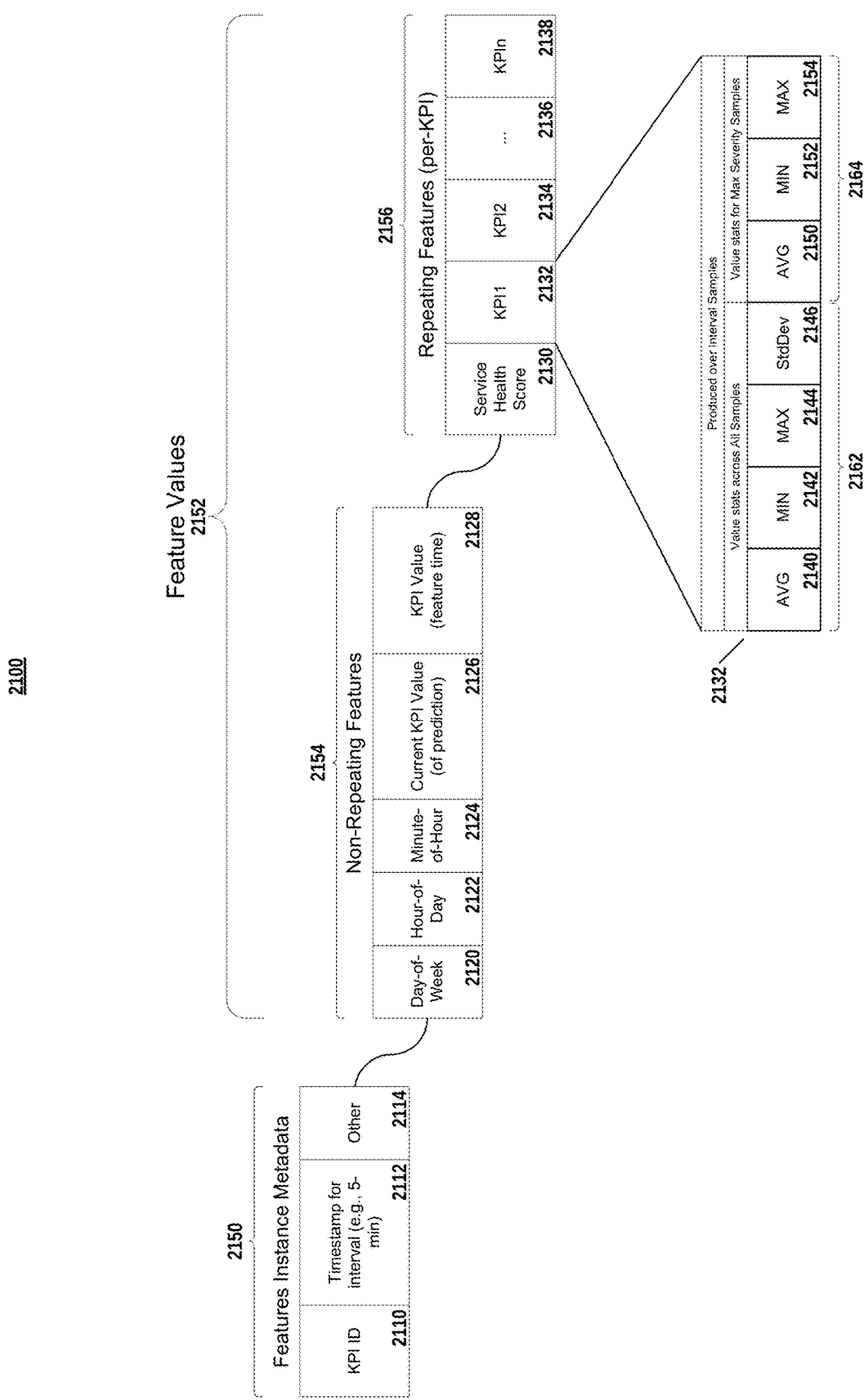
FIG. 21 depicts an example feature data instance for KPI prediction as may be employed in one embodiment.

FIG. 21 depicts an example feature data instance for KPI prediction as may be employed in one embodiment. A feature data instance includes values for each of the feature items or fields that are inputs to the model for predicting future values. A feature data instance, at least as regards a feature data instance used for processing to train a prediction model such as discussed earlier in relation to block 2012 of FIG. 20, may include one or more actual, historic values for the prediction field (i.e., the field whose value is be the predictive output of the model).

Feature data instance 2100 as illustrated by FIG. 21 is shown to include features instance metadata segment 2150, nonrepeating features segment 2154, and repeating features segment 2156. Further, a breakout portion of FIG. 21 provides greater detail as to one component of repeating features segment 2156 having a KPI-value statistics segment 2162, and a KPI-value-at-maximum-severity statistics segment 2164.

Features instance metadata segment 2150 of example features data instance 2100 of FIG. 21 is shown to include a KPI ID field value 2110, timestamp field value 2112, and Other one or more field values 2114. Metadata segment 2150 of an embodiment may include as much or as little metadata information as may be desired in the embodiment to describe, characterize, classify, identify, tag, or otherwise annotate the set of feature values and any other information represented in the remainder of the features instance 2100. In one embodiment KPI ID field value 2110 may indicate a unique KPI identifier to which the features instance relates. In one embodiment, timestamp field value 2112 may contain a date and/or time indicating value of appropriate resolution that identifies, characterizes, or otherwise indicates a point in time or an interval, duration, period, segment, or such, of time, to which the feature values of the instance correspond or relate. In one embodiment, timestamp field value 2112 may include a value indicating a specific calendar date and time with millisecond resolution that represents the starting time of an interval of time to which the feature values relate. In one embodiment, timestamp field value 2112 may include a value indicating a specific calendar date and time with millisecond resolution that represents the ending time of an interval of time to which the feature values relate. In one embodiment, timestamp field 2112 may include an interval sequence number indicating the ordinal position in time the current features instance has relative to other features instances. Many embodiments are possible.

Nonrepeating features segment 2154 of example features data instance 2100 of FIG. 21 is shown to include Day-of-Week field value 2120, Hour-of-Day field value 2122, Minute-of-Hour field value 2124, current KPI field value 2126, and feature-time KPI field value 2128. Day-of-Week (e.g., Sunday, Sun, Thursday, Sat, 1, 7), Hour-of-Day (e.g., 0, 13, 12 AM, 5 PM), and Minute-of-Hour (e.g., 0, 17, 59, :00, :17, :59) data fields include values that would indicate the meaning suggested by their names and that provide a reference in time for other feature values of the instance (except predicted current KPI field value 2126). In one embodiment, the values for the various cyclic time unit fields 2120, 2122, and 2124, may be derived from the timestamp field value 2112 or otherwise. Current KPI field value 2126 indicates a representative value for the KPI at the "current time" predicted by an associated model. In one embodiment, current KPI field value 2126 indicates an average value for all of the point-in-time KPI values produced for an interval of time that is offset into the future from the time generally represented by the features instance, and as may be reflected in field values 2112, 2120, 2122, and 2124. The amount of the time offset may correspond to distance into the future a model is intended to predict. In one embodiment, current KPI field value 2126 indicates the singular value produced for the KPI at a point in time that is offset into the future from the time generally represented by the features instance, and as may be reflected in field values 2112, 2120, 2122, and 2124. In an embodiment, where the point or interval of time generally represented by the features instance is so recent (e.g., is less than one time offset old) that a value for 2126 cannot be determined from an actual or historical record, a substitute value believed innocuous to model performance may be included, such as a null, minimum, maximum, average, most recent, or duplicated value, for example. Other embodiments are possible. Feature-time KPI field value 2128 indicates a representative value for the KPI at the time generally represented by the features instance, and as may be reflected in field values 2112, 2120, 2122, and 2124. In one embodiment, for example, feature-time KPI field value 2128 may indicate a representative KPI value for a point or interval of time that is 5, 10, 15, 20, 25, 30, 45, 60, 120, 360, or some other number of seconds, minutes, hours, days, or such, earlier than the point or interval of time associated with current KPI field value 2126. Many embodiments are possible. As suggested, in an embodiment, all field values in the features instance may correspond to the same time point or interval, except for the current KPI 2126 which may correspond to a point or interval in time that is later by the amount of a prediction offset, period, or window, and which may be a target model output value rather than an input feature.

In examples here illustrated, described, and discussed in order to teach and impart an understanding of inventive aspects, the extent used for the time offset value of the current KPI relative to the other features is 30 minutes, which corresponds to the example prediction timeframe, discussed earlier.

Repeating features segment 2156 of example features data instance 2100 of FIG. 21 includes sets, groups, collections, swaths, or such, of fields that are repeated for each of the involved KPIs. Whether or not generally described, categorized, or implemented as such in an embodiment, here the service health score, or some adaptation or derivative, may be treated as another KPI. Accordingly repeating features segment 2156 of features instance 2100 is shown to include service health score feature set 2130, KPI1 feature set 2132, KPI2 feature set 2134, intervening KPI feature sets 2136, and KPIn feature set 2138, where KPI1 through KPIn are the involved KPIs of the illustrated example.

FIG. 21 includes a blowout of KPI1 feature set 2132 to illustrate the example contents of a KPI feature set of an example embodiment. Assuming an illustrative example where feature data instance 2100 is representative of a time interval rather than a point in time, the field values shown for KPI1 feature set 2132 each represent a statistic determined over presumably multiple instances (i.e., samples) of KPI value data produced in respect to the relevant time interval. For example, if an SMS produces a new value for KPI1 every minute, and the time interval represented by features data instance 2100 is five minutes, the field values shown for KPI1 feature set 2132 each represent a statistic determined over five samples of KPI1 data. KPI production rates and feature data time intervals may, of course, vary. KPI-value statistics segment 2162 of example features data instance 2100 is shown to include average field value 2140, minimum field value 2142, maximum field value 2144, and standard deviation field value 2146, each of which is the value of its namesake statistic performed over all of the KPI samples of the interval. KPI-value-at-maximum-severity statistics segment 2164 of example features data instance 2100 is shown to include average field value 2150, minimum field value 2152, and maximum field value 2154, each of which is the value of its namesake statistic performed over a subset of the KPI samples of the interval, ranging from zero to all of the KPI samples of the interval. As illustrated, the KPI samples of the interval selected for the subset are those associated with a concurrent state, condition, or attribute of the KPI, here, the condition that the KPI sample is associated with a maximum severity state. Such a state, condition, attribute, or such, associated with the KPI value in time may be further appreciated by consideration of FIGS. 28-31F and the related discussion of the reference SMS disclosure regarding thresholds used to determine KPI severity states.

As regards the content of a KPI feature set, as elsewhere, one of skill is not constrained in the practice of inventive aspects by the examples and details used as illustrations in order to convey an understanding of inventive aspects and their usefulness. For example, in one embodiment KPI-related values of a feature set may be point values rather than statistics across multiple samples. For example, an embodiment may use any combination of one or more statistics over some set of KPI samples selected from among the statistics illustrated or any others, such as median, $n^{th}$-percentile, and others. For example, an embodiment including values or statistics related to sample subsets may use the same or different criteria for identifying the subset members, such as $2^{nd}$-highest severity, top 2 severities, minimum trend duration, maximum trend magnitude, and others. Similarly, the content, structure, organization, representation, and other aspects of a logical features data instance in an embodiment is not constrained by the details illustrated and discussed here. Many embodiments are possible and within the grasp of one of ordinary skill in the art after full consideration of this disclosure.

In an embodiment, some or all of the values of a features data instance such as 2100 of FIG. 21, that will serve as input features to a model training, fitting, testing, or application process, may be preprocessed at some point to: improve a model quality such as accuracy; to reduce the computational intensity of processing and thereby conserve computing resources; or to achieve some other advantage. In one embodiment, some or all such values is normalized or standardized by determining a StandardScaler-based or Z-score-based value, known in the art, for each of the field values for a field across some set, group, collection, or such, of feature data instances for use in a process, for example. Information regarding one implementation of a StandardScaler function is found by directing a web browser to "//en.wikipedia.org/wiki/Standard score" prefixed with an "http:" protocol indicator. Information regarding Z-score standardization may be found by directing a web browser to "//scikit-learn.org/stable/modules/generated/sklearn.preprocessing" prefixed with an "http:" protocol indicator, for example. Information regarding feature scaling generally as one category of methods useful in preprocessing feature data that may include, for example, rescaling, mean normalization, standardization, and scaling to unit length, may be found by directing a web browser to "//en.wikipedia.org/wiki/Feature_scaling" prefixed with an "http:" protocol indicator, for example. Many embodiments are possible.

Figure 22:
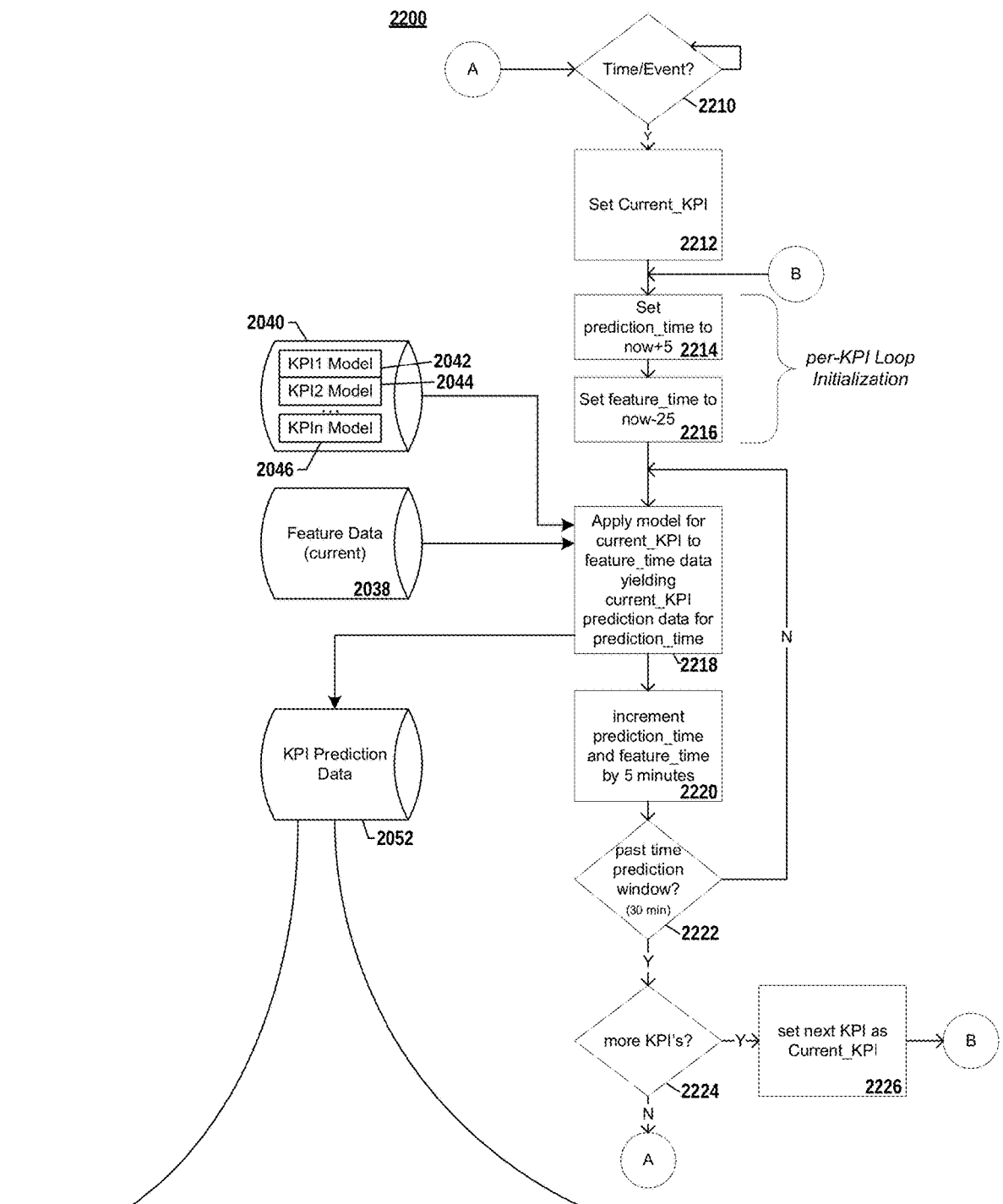
FIG. 22 depicts a processing flow for producing multivariate KPI predictions in one embodiment.

FIG. 22 depicts a processing flow for producing multivariate KPI predictions in one embodiment. The multivariate model for future KPI value prediction of this example produces superior prediction data over a univariate model that predicts future KPI values based on past values of the KPI alone. The greater predictive accuracy eliminates the expenditure of computing resources to perform unnecessary and potentially compounding automated and/or user-driven processing in response to inaccurate prediction values.

Processing flow 2200 of FIG. 22 represents an embodiment as may be useful to effect the processing of Apply Models block 2016 of FIG. 20. Process flow 2200 of FIG. 22 is shown to begin at block 2210 where a determination is made whether a time has been reached or some other triggering event has occurred that signals the need to produce a logical data construct having newly-determined KPI prediction values. In one embodiment, a triggering event recognized at block 2210 may be an indication of received input from a user such as may be the case in an embodiment where an interactive user interface enables a user to signal, indicate, trigger, command, request, direct, or the like, the performance of KPI prediction processing. In one embodiment, a frequency or schedule, as may be represented in the command/control/configuration data of the SMS such as CCC data 1924 of FIG. 19, may be a basis for determining whether a time has been reached at block 2210. In one embodiment, a triggering event recognized at block 2210 may be a notable event created by the operation of the SMS that signifies some state or condition of the monitored IT environment. Many embodiments are possible. If a negative determination is made by the processing of block 2210, processing cycles or waits at block 2210 until a positive determination is made. If a positive determination is made by the processing of block 2210, processing proceeds to block 2212.

The embodiment of the KPI prediction process illustrated by processing flow 2200 substantially embodies a pair of nested loops. The outer loop cycles over the set of KPIs to be predicted, one at a time. The per-KPI inner loop cycles over a number of increments in a prediction window for the KPI currently being processed. For example, the inner loop may increment five minutes at a time through a 30-minute prediction window. Processing block 2212 performs initialization processing for the outer loop. Processing blocks 2214 and 2216 perform initialization processing for the inner loop. Processing blocks 2218, 2220, and 2222, represent inner loop processing. Processing blocks 2224 and 2226 represent outer loop processing.

At block 2212, the KPI for which predicted values are first to be made is identified and established nominally as the current KPI. At block 2214, the time corresponding to the value to be predicted for a first time increment for the current KPI is identified and established nominally as the prediction time. In this example, as illustrated and discussed, processing flow 2200 uses the most recent feature data instances presumed to represent up to and including the current (now) state of the monitored service, and projects out the next 30 minutes (prediction window) in six 5-minute increments. Accordingly, the processing of block 2214 establishes the first prediction time as five minutes from now (now+5). The processing of block 2216 identifies and establishes a feature time companion to the prediction time. The feature time identifies the time or timeframe of feature data instances used in predicting the future KPI value. Assuming, in this example, KPI prediction models 2040 (as may have been produced by the processing of block 2012 of FIG. 20) with a prediction timeframe of 30 minutes, the feature time established by the processing of block 2216 backs off of the prediction time (now+5) by the measure of the prediction timeframe of the model (30 minutes), resulting in a feature time of 25 minutes in the past (now−25). The foregoing results in using data associated with 25 minutes ago to predict the KPI value associated with five minutes from now. At the conclusion of the processing of block 2216 for the illustrated embodiment, the outer and inner loops are initialized and substantive inner loop processing for the first KPI can ensue, starting at block 2218.

At block 2218, processing is performed to determine a value for the current KPI at the prediction time by effectuating the processing indicated by the model of 2040 for the current KPI against the feature data instances of 2038 associated with the feature time. Assuming, for example, processing is in the first iteration of the inner loop for the current KPI, KPI1, the processing of block 2218 determines a value for KPI1 at now+5 by effectuating the processing indicated by model 2042 against a relevant one or more instances of feature data 2038 associated with the time now−25 and/or the time now+5. The predicted value for the KPI is reflected in KPI prediction data store 2052. Processing may then proceed to block 2220. At block 2220, the prediction time and the feature time of the inner loop are adjusted to the next increment in the prediction window. In this example, the processing of block 2220 increments each the prediction time and the feature time by five minutes, the increment amount of the example. Accordingly, the first time through the inner loop for a particular KPI, the processing of block 2020 will set the prediction time to now+10 and set the feature time to now−20. At some iteration of the inner loop, the processing of block 2220 will advance the prediction time beyond the time of the prediction window. In our example, that will happen after six incremental KPI value predictions are made. A determination is made at block 2222, essentially whether all of the incremental predictions for the time prediction window are complete. If not, processing returns to block 2218 where the next incremental prediction is made. If so, processing proceeds to block 2224.

At block 2224, a determination is made whether there are KPIs still needing predicted values for the prediction window. If not, this cycle of KPI prediction is complete and processing returns to block 2210 to await the start of the next cycle. If so, some next KPI still in need of predicted values is identified and established as the current KPI and processing proceeds to block 2214 to start another iteration of the outer loop.

One of skill will appreciate the many ways where the effective processing described in relation to the example of processing flow 2200 can be implemented. One of skill appreciates that what may be described as a single operation may be implemented as multiple independent operations, that what may be described as multiple independent operations may be implemented as a single operation, that processing that has been described in a particular order may be implemented with variations to that order, that described operations may be omitted and/or others added, that what has been described as a sequence of operations could be implemented using parallel operations, that one or more combinations of one or more operations may be effectively subsumed by hidden and/or embedded software and/or hardware functionality that is invoked such that the operations may not be readily apparent in a high order representation of the programming logic used to effectuate processing in the similitude of that depicted and described in relation to FIG. 22. As one small example, a substantial portion of the processing depicted by FIG. 22 to produce a set of incremental predicted values over a prediction window for multiple KPIs may be susceptible to implementation with perhaps a single line of code in a programming environment having sophisticated data matrix operations included or integrated. Many embodiments are possible.

Logical data construct 2052a of FIG. 22 illustrates one possible data construct, collection, structure, organization, representation, or the like for the KPI prediction data 2052 as produced by the processing described in relation of block 2218. KPI prediction data construct 2052a is shown in a tabular representation having one row or tuple for each KPI, and columns for a unique KPI identifier (KPI ID), a timestamp indicating the "now" time used for the prediction run, and one column for each of the incremental time predictions corresponding to times at now+5, 10, 15, 20, 25, and 30. One of skill appreciates the variety of implementations to physically and logically reflect the KPI prediction data in computer storage and the readiness with which the implementation could vary or be permuted over time to accommodate or advantage immediate or anticipated processing needs.

Figure 23:
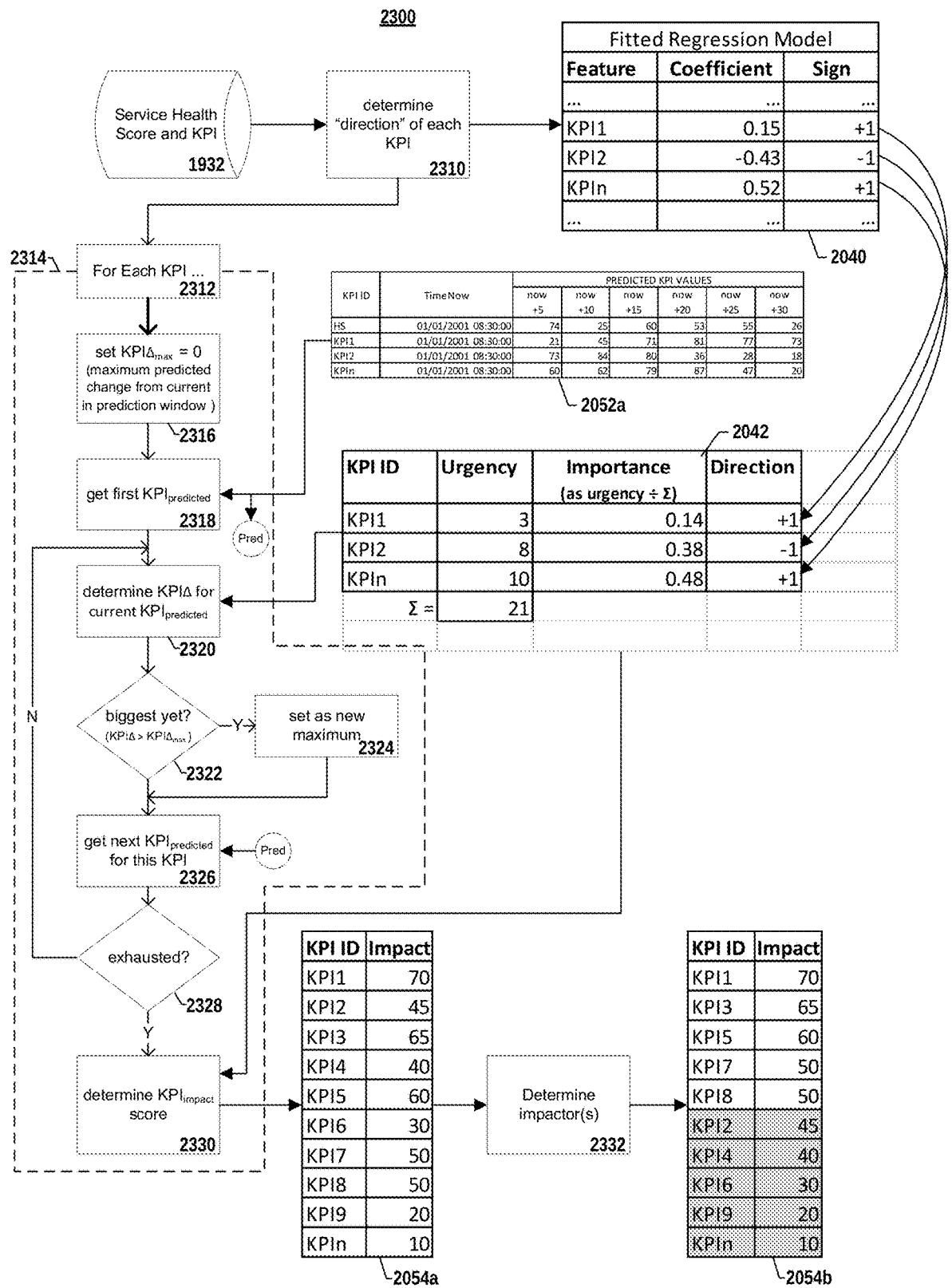
FIG. 23 depicts a processing flow for producing impactor identifications in one embodiment.

FIG. 23 depicts a processing flow for producing impactor identifications in one embodiment. The processing depicted by FIG. 23 is such as may be useful to perform the processing described in relation to block 2022 of FIG. 20. One of skill will understand that data values shown in FIG. 23 are for illustration, and may or may not reflect actual values corresponding to the processing described for processing flow 2300. Processing flow 2300 of FIG. 23 is shown to include processing block 2310 where a direction value or indicator is determined for each KPI of the set of involved KPIs, of the set of directly related service KPIs, or of some other set of KPIs bearing on service health. The direction value is determined for each KPI in the illustrated embodiment to ensure for downstream processing that KPI values are properly evaluated in terms of their relationship to the service health score. For example, in one SMS configuration higher values for a KPI1 may generally correlate to higher values for the service health score, while higher values for a KPI2 may generally correlate to lower values for the service health score. Accordingly, it may be useful in an embodiment when determining a measure of the impact of a KPI on the health score to include a consideration of the direct or inverse, positive or negative, relationship between the KPI and health score. In one embodiment, the processing of block 2310 may evaluate CCC data of the SMS to see whether higher or lower KPI threshold values correspond to higher or lower severity states, and deduce direction therefrom (not shown). In one embodiment suggested by the depiction of processing flow 2300 of FIG. 23, the processing of block 2310 uses service health score and KPI data 1932, rather than CCC threshold data, to determine each KPI's direction. In such an embodiment, processing of block 2310 fits a regression model to predict service health score, for example, to historic service health score and KPI data 1932 with the KPI data as the model input features. The resulting model, in one embodiment, includes a positive or negative coefficient for each KPI feature. The sign of that coefficient, positive or negative, represents the directionality of the KPI. In one embodiment, the processing of block 2310 may extract sign data from the fitted regression model 2040 and reflect it in computer storage in association with other KPI-specific values as shown at 2042. The processing of block 2310 to determine a direction value for each KPI is a preparatory step of process flow 2300 before engaging in processing to determine a KPI impact score for each KPI. In one embodiment, the processing of block 2310 may be repeated every time impact scores are to be determined. In one embodiment, the processing of block 2310 may automatically occur on a timed basis such as according to a frequency or schedule. In one embodiment, the processing of block 2310 may be performed only when initiated in response to a user indication as may be provided by a user interface, for example. In one embodiment, the processing of block 2310 may be performed at the occurrence of an event, such as the creation and collection of data for new KPI. Many embodiments are possible. Processing flow 2300 indicates that at some point subsequent to the determination of KPI directions by the processing of block 2310, processing can proceed at block 2312.

Block 2312 represents the top of a processing loop 2314 that is iterated to determine an impact score for each KPI. The impact score is determined for each KPI in this example embodiment as the combination of predicted KPI information and an independent weighting factor. Other embodiments may use other formulations. Here, specifically, the greatest difference between the KPI value as it was at the current time used for KPI prediction (to, TimeNow of 2052a) and any one of the KPI values predicted for the increments of the prediction window (the $KPI\Delta_{max}$), is multiplied by an importance factor and direction to determine the impact score. Such a determination is effected in the example process flow 2300 beginning at block 2316. At block 2316, a variable to keep track of the maximum KPIΔ ($KPI\Delta_{max}$) is initialized to zero. At block 2318, the predicted value for the first increment of time of the prediction window for the KPI, from predicted KPI data 2052a, is established as the $KPI_{predicted}$ value. For example, if KPI1 were being processed, the processing of block 2318 would establish 21 as the value of $KPI_{predicted}$. At block 2320, a KPIΔ is calculated as the difference between the to KPI value and $KPI_{predicted}$. A determination is made at block 2322 whether the KPIΔ value determined at block 2320 is the greatest yet for this KPI, i.e., is KPIΔ greater than $KPI\Delta_{max}$? If so, processing proceeds to block 2324 where the current KPIΔ value is established as the value of $KPI\Delta_{max}$, with processing then proceeding to block 2326. If not, processing proceeds directly to block 2326.

At block 2326, the predicted value for the next increment of time of the prediction window for the KPI, from predicted KPI data 2052a, is established as the $KPI_{predicted}$ value. Continuing with our example, where KPI1 is being processed, the first processing of block 2326 would establish 45 as the value of $KPI_{predicted}$. At block 2328, a determination is made whether all prediction increments of the prediction window for the KPI have been exhausted in the determination of $KPI\Delta_{max}$. If not, processing returns to block 2320 with a new increment prediction. If so, processing proceeds to block 2330.

At block 2330, a KPI impact score ($KPI_{impact}$) is determined for the KPI currently being processed. In an embodiment, the KPI impact score represents some measure indicating the prospective influence the KPI, and automated or other work expended to change it, may have on some reference health score or similar service measure, such as a predicted future service health score. Here, the KPI represents all that undergirds it, including the components or entities providing the data from which a value for the KPI is derived, for example. A predicted future service health score or other reference health score may correspond in time some way to a prediction window that underlies the impact scores, for example, the later end of the prediction window may coincide in time with the predicted future health score, in an embodiment. In the example embodiment, the KPI impact score is calculated as the product of $KPI\Delta_{max}$ and an importance weighting factor for the KPI from 2042 and the KPI direction value from 2042, i.e., $KPI_{impact}=KPI\Delta_{max} \times KPI_{importance} \times KPI_{direction}$. In one embodiment, an urgency value attributed to the KPI, and possibly recorded in its definition among the command/control/configuration (CCC) data of the SMS, is used directly as the $KPI_{importance}$. In one embodiment, as suggested by the depiction of FIG. 23, the importance value for the KPI is derived from such an urgency value. The importance values depicted in the example of 2042 are derived for each KPI by dividing the urgency value associated with the KPI by the sum of the urgency values for all of the KPI's. The determined KPI impact score is reflected in computer storage in association with some identification of the KPI as indicated by illustrative impact score table 2054a. At the end of the processing of block 2330 which determines the impact score for the KPI currently being processed, processing may proceed to block 2312 where an iteration of processing loop 2314 for any next KPI can be initiated. Impact score table 2054a enables relative comparisons of estimates prospective influence to be made between and among KPIs. After impact scores of been determined for all of the KPIs in the illustrated embodiment, processing proceeds to block 2332.

At block 2332, the service health score impactors are determined. In the embodiment illustrated in FIG. 23, the service health score impactors are determined by sorting the impact score table in descending order of impact score and selecting the top five entries as the reportable or high likelihood impactors of the service health score for the service. Accordingly, tabular data construct 2054b appears as a sorted version of impact score table 2054a with all but the top five entries grayed out to indicate a non-selected, excluded, disabled, inactive, deleted, or otherwise discounted state. Embodiments may, of course, vary. In one embodiment, the same sorted table may be used but only those top entries exceeding some threshold impact score and not exceeding a maximum impactor count are retained as the impactor set or subset. And, the same sorted table may be used with additional external information such as a correctability score for each KPI that indicates some measure of the speed and/or ease with which successful anticipatory remediation has been accomplished in the past in relation to that KPI. In one such embodiment, such a correctability score may be entered by an analyst via a user interface and stored along with other CCC information relating to the KPI in its definition. In one such embodiment, such a correctability score may be automatically determined by processing historic event data. Such embodiments may also vary with regard to how the impact score is combined with the correctability score for the determination of impactors. One of skill will also appreciate that additional factors such as a correctability score may have been introduced into the determination of the KPI impact score by the processing of block 2330 thereby producing a score aptly considered as a correctable-impactor-type, or other appropriate type, impact score. These and other variations and adaptations are possible and can be appreciated by one of skill in the art after consideration of subject matter embraced by this entire disclosure.

At the completion of example processing flow 2300 of FIG. 23 a set of impactor KPIs is identifiable using the output 2054b of processing block 2332. Many data structures, formats, representations, and such, may be used to reflect the output of the Determine Impactor(s) block 2332, any of which may be referred to in a shorthand form as an impactor list as each may be, may embody, may be readily reducible to, or may logically be capable of providing, such a list. Embodiments may vary, as earlier indicated, as to the factors used to determine an impact score and as to the factors used to identify the KPIs on the impactor list. In an embodiment, the impactor list represents a triaged or prioritized version or subset of the greater KPI list, which impactor list identifies the KPIs to which corrective attention by automated, human, or hybrid means, have the relative highest likelihoods by some measure of preventing, postponing, diminishing, or otherwise reducing, an unfavorable future service performance state or condition as measured by a service health score in one embodiment. Each KPI on such an impactor list is identified as an impactor or impactor-KPI. Many embodiments are possible. One of skill can appreciate many possible uses for such an impactor list during the operation of an automated service monitoring system (SMS) after consideration of this disclosure. Illustrative examples are next discussed in relation to FIGS. 24 and 25.

Figure 24:
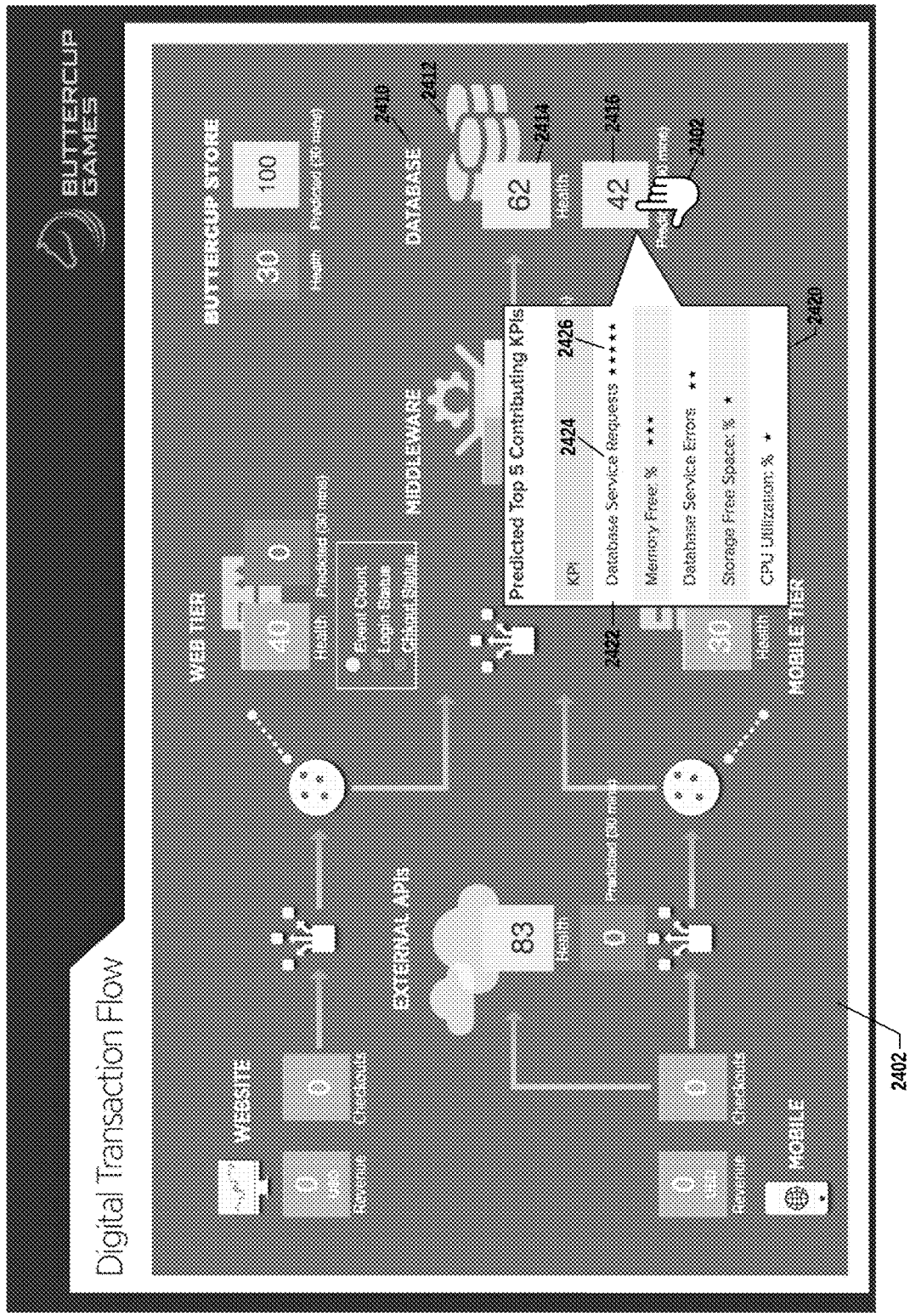
FIG. 24 depicts a first sample user interface display determined in part by impactor identification.

FIG. 24 depicts a first sample user interface display determined in part by impactor identification. Interface display 2400 of FIG. 24 is such as might be generated by the processing of block 2024 of FIG. 20 and perhaps displayed on a user interface device such as 1938 of FIG. 20 when the processing of block 2024 causes the display of the generated display. User interface display 2400 of FIG. 24 reflects a time during the display in operation of the user interface where the user has interacted to place a cursor indicator 2402 over an interactive display element, component, item, icon, widget, or such, to cause the presentation of related information in the user interface display such as with the hover-over, pop-up balloon 2420. In this example, the user interaction with interactive element 2416, which presents a predicted health score for a database service, results in the presentation of information balloon window 2420 apparently over the top of the pre-existing content of main display area 2402 in pop-up fashion. The pre-existing content of main display area 2402 of this example may be a user interface display including a layout of display elements including widgets which may serve as vehicles for the display of SMS data such as KPI values or health scores as more fully discussed in the reference SMS disclosure, as discussed earlier. Accordingly, text display element 2410 may present the name of the service ("DATABASE"), an icon depicting three disk storage volumes representative of the service 2412, a widget 2414 displaying the health score of the service, and a widget 2416 displaying a predicted health score for the service.

Informational balloon user interface component 2420 is shown to include a title, "Predicted Top 5 Contributing KPIs", a column name, "KPI", and multiple rows or entries of which row 2422 is an example. Row/entry 2422 is shown to include a KPI name or identifier 2424, "Database Service Requests", and a star value indicator band 2426 showing five stars. Processing of the computing machine generating interface display 2400 in this illustrative embodiment conditioned or determined aspects of the generated interface display based on an impactor list for the DATABASE service after the fashion of impactor list 2054b of FIG. 23. For example, such an embodiment may have determined the KPI names/identifiers to incorporate into the content of 2420, such as 2424, by referencing such stored names/identifiers directly from the impactor list or by indirectly referencing such stored names/identifiers via the impactor list. Many embodiments are possible where such processing logic which functions to generate a representation of a user interface display (perhaps an HTML representation) employs data of an impactor list to condition its operation. For example, such an embodiment may have determined the content of the star value indicator bands, such as 2426, based at least in part on the impact score of the impactor list, perhaps in view of a set of one or more thresholds used to map impactor scores to star ratings. Many embodiments are possible. For example, in addition to or as an alternative to the star value indicator bands, an embodiment may use impactor score information directly or indirectly available via the impactor list to set a visual attribute for an entry, e.g., 2422, such as its background color, text color, text size, text style, or some other attribute. Moreover, in one example embodiment, a particular user interaction with display component 2416, rather than causing the presentation of informational balloon 2422, may instead cause navigation to a different user interface display such as that depicted and discussed in relation to FIG. 25

Figure 25:
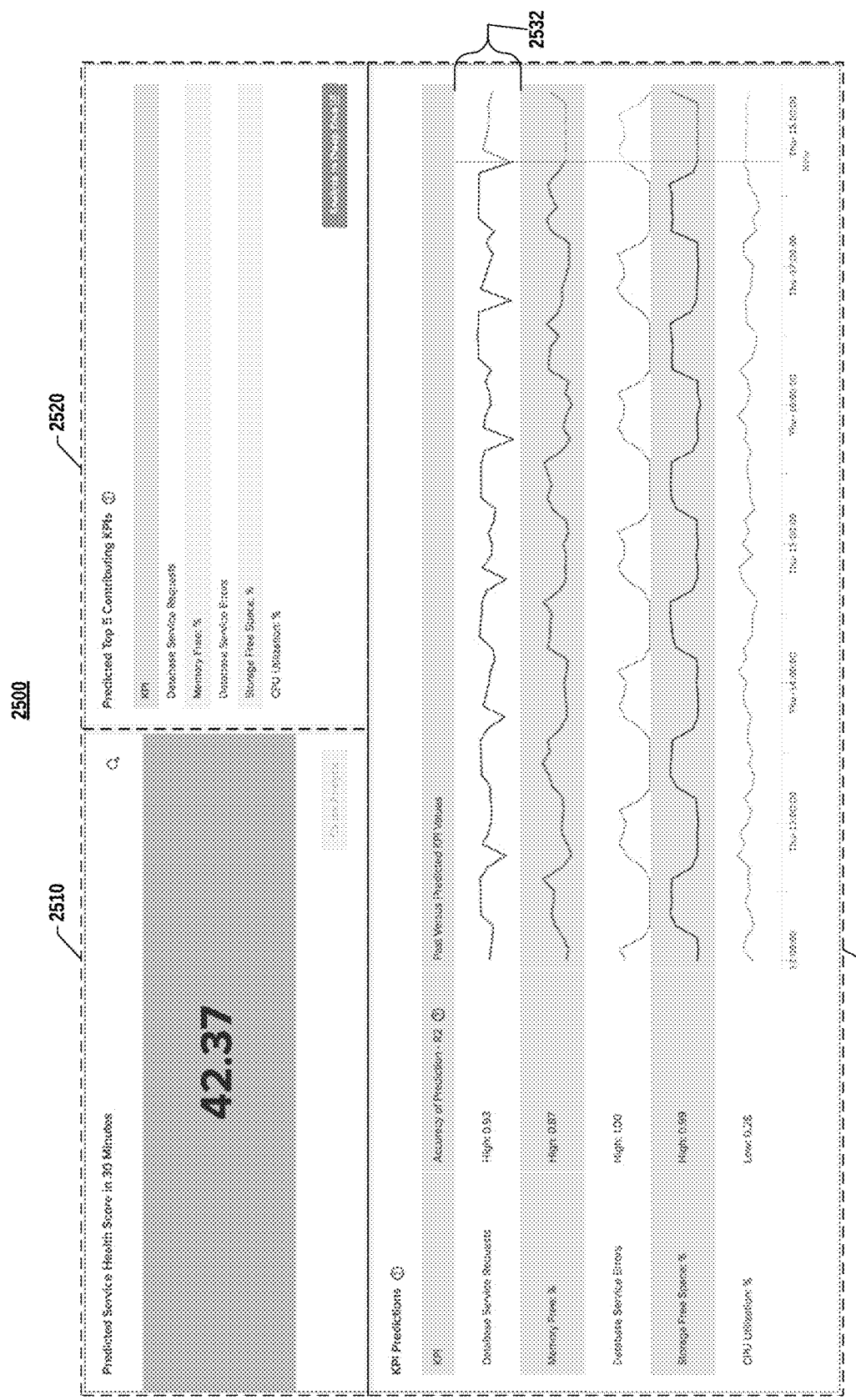
FIG. 25 depicts a second sample user interface display determined in part by impactor identification.
Figure 26:
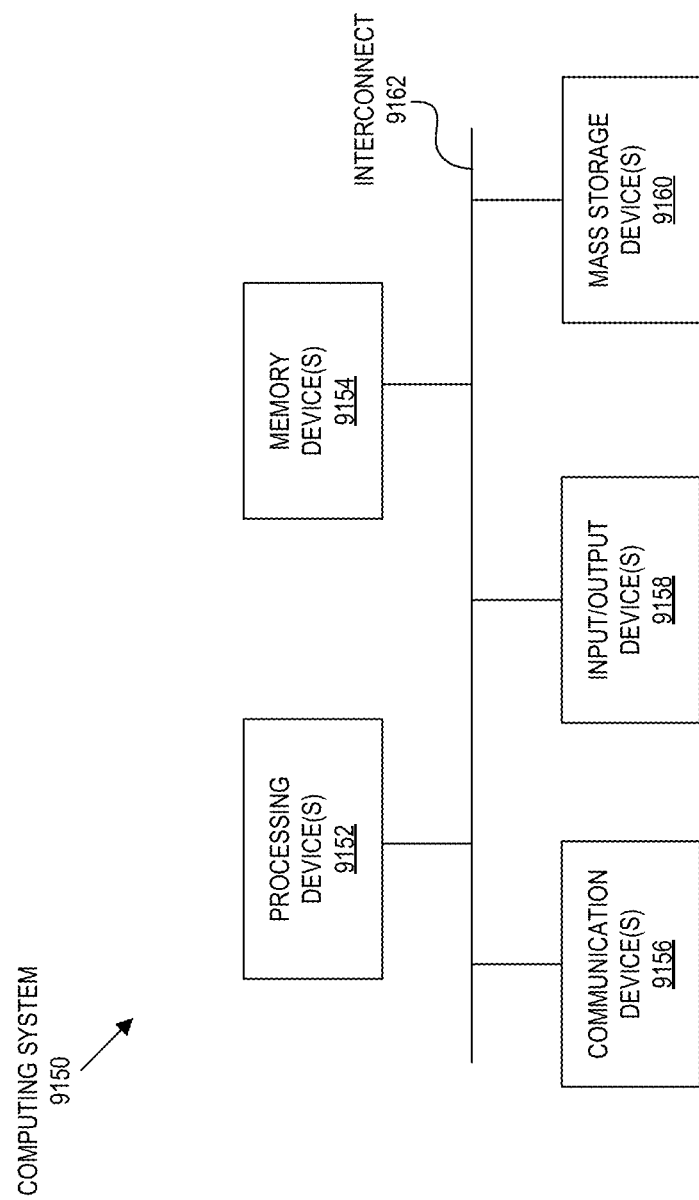
FIG. 26 is a block diagram illustrating a high-level example of a hardware architecture of a computing system in which an embodiment may be implemented.

FIG. 25 depicts a second sample user interface display determined in part by impactor identification. Interface display 2500 of FIG. 25 is again such as might be generated by the processing of block 2024 of FIG. 20 and perhaps displayed on a user interface device such as 1938 of FIG. 20 when the processing of block 2024 causes the display of the generated display. In such a case, the processing of block 2024 of FIG. 20 represents processing as may be denominated under an investigative or remediation component, module, segment, block, or other identifiable functional portion of the SMS. Interface display 2500 of FIG. 25 is shown to include predicted service health score display component 2510, impactor KPI listing display component 2520, and impactor KPI data timeseries display component 2530. Predicted service health score display component 2510 in one embodiment may include substantially the same information as widget 2416 of FIG. 24, perhaps with additional detail. Impactor KPI listing display component 2520 in one embodiment may include much or all of the same information as informational balloon 2420 of FIG. 24, perhaps with additional related information. Impactor KPI data timeseries display component 2530 may include parallel graph lanes, perhaps having a common timeframe, of which graph lane 2532 of FIG. 25 is an example. Graph lane 2532 in this example embodiment is shown to include a KPI name/identifier, "Database Service Requests", a prediction accuracy rating and score, "High" and "0.93", respectively, and a graphical depiction of the timeseries data for the respective KPI over a timeframe, the timeframe perhaps including an actual or historic segment, and a predicted or future segment. The content and generation for display component 2530 may somewhat or largely comport with subject matter regarding a user interface display including parallel graph lanes of the reference SMS disclosure. From the foregoing discussion, one of skill will appreciate how the programming logic generating a representation of the user interface display 2500 depicted in FIG. 25 may repeatedly use the data of an impactor list to control and condition that operation. Many embodiments are possible and the usefulness of impactor lists to control and condition the programming logic of numerous and various SMS functions understandably extends beyond the generation of graphical user interface displays. One of skill appreciates on consideration of this disclosure that inventive aspects relating to KPI prediction and impactor identification taught herein are not limited by the examples used to illustrate those inventive aspects.

4.0. Computing System Architecture

FIG. 29 is a block diagram illustrating a high-level example of a hardware architecture of a computing system in which an embodiment may be implemented. For example, the hardware architecture of a computing system 9150 can be used to implement any one or more of the functional components described herein (e.g., metrics ingestion component 202, metrics catalog and search component 204, metrics analysis component 206, metrics sharing component 208, or metrics store component 210). The computing system 9150 can also be used to implement any of a forwarder, indexer, search head, data store, or a computing resource. In some embodiments, one or multiple instances of the computing system 9150 can be used to implement the technologies described herein, where multiple such instances can be coupled to each other via one or more networks.

The processes and logic flows described in this specification can be performed by one or more programmable processors executing one or more computer programs to perform functions by operating on input data and generating output. For example, the computing system 9150 includes one or more processing devices 9152, one or more memory devices 9154, one or more communication devices 9156, one or more input/output (I/O) devices 9158, and one or more mass storage devices 9160, all coupled to each other through an interconnect 9162.

The interconnect 9162 may be or include one or more conductive traces, buses, point-to-point connections, controllers, adapters, and/or other conventional connection devices. Each of the processing devices 9152 controls, at least in part, the overall operation of the processing of the computing system 9150 and can be or include, for example, one or more general-purpose programmable microprocessors, digital signal processors (DSPs), mobile application processors, microcontrollers, special purpose logic circuitry, e.g., a field programmable gate array (FPGA) or an application specific integrated circuit (ASIC), or the like, or a combination of such devices.

Each of the memory devices 9154 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 9160 can be or include one or more hard drives, digital versatile disks (DVDs), flash memories, or the like. Each memory device 9154 and/or mass storage device 9160 can store (individually or collectively) data and instructions that configure the processing device(s) 9152 to execute operations to implement the techniques described above.

Processors suitable for the execution of a computer program include, by way of example, both general and special purpose microprocessors, and any one or more processors of any kind of digital computer (e.g., processing devices 452). Generally, a processor will receive instructions and data from a read-only memory or a random access memory or both. The essential elements of a computer are a processor for performing instructions and one or more memory devices for storing instructions and data. Generally, the computer system 9150 will also include, or be operatively coupled to receive data from or transfer data to, or both, one or more mass storage devices for storing data, e.g., magnetic, magneto optical disks, or optical disks. However, a computer need not have such devices.

Each communication device 9156 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 9152, each I/O device 9158 can be or include a device such as a display (which may be a touch screen display), audio speaker, keyboard, mouse or other pointing device, microphone, camera, etc. Note, however, that such I/O devices 9158 may be unnecessary if the processing device 9152 is embodied solely as a server computer.

The computing system 9150 can include clients or servers. A client and server are generally remote from each other and typically interact through a communication network. The relationship of client and server arises by virtue of computer programs running on the respective computers and having a client-server relationship to each other. In the case of a client device, the communication devices(s) 9156 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 9156 can be or include, for example, any of the aforementioned types of communication devices, a wired Ethernet adapter, cable modem, DSL modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 454). A processor (e.g., processing device(s) 452) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 9152), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 9154).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 9150 can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor (e.g., processing devices 452) and the memory (e.g., memory device 9154) can be supplemented by, or incorporated in, special purpose logic circuitry.

To provide for interaction with a user, architecture provider or reviewer, embodiments of the subject matter described in this specification can be implemented with a display device of the I/O devices 9158, e.g., a CRT (cathode ray tube) to LCD (liquid crystal display) monitor, for displaying information to the user and a keyboard and a pointing device, e.g., a mouse or a trackball, by which the user can provide input to the computer. Other kinds of I/O devices 9158 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some embodiments, the computing system 9150 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

5.0. Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above as may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various identification and marketing service functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Similarly, various components of the illustrated systems can be implemented in other virtualization constructs, such as one or more containers (operating-system-level virtualizations) within a containerization framework like Docker by Docker, Inc., perhaps facilitated with a container orchestration facility like the open source Kubernetes, both widely known. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed:

1. A method performed by one or more processing devices, the method comprising:
    identifying, for a plurality of key performance indicators (KPIs), a prediction time window comprising a plurality of prediction times, wherein the plurality of KPIs are associated with a service implemented in an information technology (IT) environment, wherein each KPI of the plurality of KPIs is defined by a corresponding search query that derives, from machine data, one or more values associated with a point in time or a period of time;
    determining, for a KPI of the plurality of KPIs, a baseline value corresponding to a time preceding the prediction time window;
    for each of the plurality of prediction times within the prediction time window, determining a corresponding predicted value of the KPI;
    identifying, by iterating over the plurality of predicted values of the KPI, a maximum difference between the baseline value of the KPI and a predicted value of the KPI selected from the plurality of predicted values of the KPI;
    determining a positive or negative sign indicative of directionality of a regression coefficient associated with the KPI;
    determining an impact score of the KPI, wherein the impact score reflects influence of the KPI on a reference service health score of the service, and wherein the impact score depends upon the identified maximum difference and the sign of the regression coefficient associated with the KPI;
    outputting the impact score to a service monitoring system associated with the IT environment to cause the service monitoring system to perform a corrective action; and
    causing presentation of a user interface including an indication of a subset of the plurality of KPIs, the subset determined based on respective impact scores.

2. The method of claim 1, wherein each KPI of the plurality of KPIs indicates a measure of performance for a corresponding service implemented in the information technology (IT) environment, the corresponding service having a service definition identifying one or more entities that provide the corresponding service, each of the one or more entities having an entity definition identifying machine data pertaining to the entity, the machine data produced by one or more components of the information technology environment.

3. The method of claim 1, wherein each KPI of the plurality of KPIs is defined by a search query that derives the one or more values from machine data identified in entity definitions associated with a corresponding service, each of the one or more values associated with a point in time or a period of time.

4. The method of claim 1, wherein each KPI of the plurality of KPIs indicates a measure of performance for a corresponding service implemented in the information technology (IT) environment, the corresponding service having a service definition identifying one or more entities that provide the corresponding service, each of the one or more entities having an entity definition identifying machine data pertaining to the entity, the machine data produced by one or more components of the information technology environment, and wherein each KPI of the plurality of KPIs is defined by a search query that derives the one or more values from machine data identified in entity definitions associated with its corresponding service, each of the one or more values associated with a point in time or a period of time.

5. The method of claim 1, wherein each of the prediction times correspond to at least one of: a point in time or an interval of time.

6. The method of claim 1, wherein the reference service health score is a predicted service health score associated with the prediction time window.

7. The method of claim 1 wherein the reference service health score is a predicted service health score associated with a latest time of the prediction time window.

8. The method of claim 1, wherein the impact score is an estimate of influence relative to at least one other KPI.

9. The method of claim 1, wherein the impact score is based on at least one of: a user input and historical data related to the respective KPI and the service health score.

10. The method of claim 1, wherein the plurality of KPIs associated with the service comprises one or more KPIs that reflect a measure of performance of the service.

11. The method of claim 1, wherein the plurality of KPIs associated with the service includes at least one KPI that reflects a measure of performance of a second service having a dependency relationship with the service.

12. The method of claim 1, wherein determining the predicted value of the KPI is performed by applying a regression model.

13. The method of claim 1, wherein determining the predicted value of the KPI is performed by applying a gradient boosting model.

14. The method of claim 1, wherein determining the predicted value of the KPI is performed by applying a random forest model.

15. The method of claim 1, further comprising: causing presentation of a user interface including an indication of one or more of the plurality of key performance indicators (KPIs) based on respective impact scores.

16. The method of claim 1, further comprising: causing presentation of a user interface including an indication of a subset of one or more of the plurality of key performance indicators (KPIs), the subset determined based on at least one of: a maximum count or an impact threshold.

17. The method of claim 1, further comprising: causing presentation of a user interface including a graph lane for each of a subset of one or more of the plurality of key performance indicators (KPIs), the graph lane comprising a graphical depiction of a times series of data of the respective KPI.

18. A system comprising:
a memory; and
a processing device coupled with the memory to perform operations comprising:
identifying, for a plurality of key performance indicators (KPIs), a prediction time window comprising a plurality of prediction times, wherein the plurality of KPIs are associated with a service implemented in an information technology (IT) environment, wherein each KPI of the plurality of KPIs is defined by a corresponding search query that derives, from machine data, one or more values associated with a point in time or a period of time;
determining, for a KPI of the plurality of KPIs, a baseline value corresponding to a time preceding the prediction time window;
for each of the plurality of prediction times within the prediction time window, determining a corresponding predicted value of the KPI;
identifying, by iterating over the plurality of predicted values of the KPI, a maximum difference between the baseline value of the KPI and a predicted value of the KPI selected from the plurality of predicted values of the KPI;
determining a positive or negative sign indicative of directionality of a regression coefficient associated with the KPI;
determining an impact score of the KPI, wherein the impact score reflects influence of the KPI on a reference service health score of the service, and wherein the impact score depends upon the identified maximum difference and the sign of the regression coefficient associated with the KPI;
outputting the impact score to a service monitoring system associated with the IT environment to cause the service monitoring system to perform a corrective action; and
causing presentation of a user interface including an indication of a subset of the plurality of KPIs, the subset determined based on respective impact scores.

19. The system of claim 18, wherein each KPI of the plurality of KPIs indicates a measure of performance for a corresponding service implemented in the information technology (IT) environment, the corresponding service having a service definition identifying one or more entities that provide the corresponding service, each of the one or more entities having an entity definition identifying machine data pertaining to the entity, the machine data produced by one or more components of the information technology environment, and wherein each KPI of the plurality of KPIs is defined by a search query that derives the one or more values from machine data identified in entity definitions associated with its corresponding service, each of the one or more values associated with a point in time or a period of time.

20. A non-transitory computer readable storage medium encoding instructions thereon that, in response to execution by one or more processing devices, cause the one or more processing devices to perform operations comprising:
identifying, for a plurality of key performance indicators (KPIs), a prediction time window comprising a plurality of prediction times, wherein the plurality of KPIs are associated with a service implemented in an information technology (IT) environment, wherein each KPI of the plurality of KPIs is defined by a corresponding search query that derives, from machine data, one or more values associated with a point in time or a period of time;
determining, for a KPI of the plurality of KPIs, a baseline value corresponding to a time preceding the prediction time window;
for each of the plurality of prediction times within the prediction time window, determining a corresponding predicted value of the KPI;
identifying, by iterating over the plurality of predicted values of the KPI, a maximum difference between the baseline value of the KPI and a predicted value of the KPI selected from the plurality of predicted values of the KPI;
determining a positive or negative sign indicative of directionality of a regression coefficient associated with the KPI;
determining an impact score of the KPI, wherein the impact score reflects influence of the KPI on a reference service health score of the service, and wherein the impact score depends upon the identified maximum difference and the sign of the regression coefficient associated with the KPI;
outputting the impact score to a service monitoring system associated with the IT environment to cause the service monitoring system to perform a corrective action; and
causing presentation of a user interface including an indication of a subset of the plurality of KPIs, the subset determined based on respective impact scores.

* * * * *